United States Patent [19]

Nakata et al.

[11] 3,773,694
[45] Nov. 20, 1973

[54] PROCESS FOR THE POLYMERIZATION OF OXIDES AND CATALYST FOR THE POLYMERIZATION

[75] Inventors: Tetsuya Nakata, Osaka; Kiyoshige Kawamata, Itami, both of Japan

[73] Assignee: Osaka Soda Co., Ltd., Osaka, Japan

[22] Filed: July 7, 1971

[21] Appl. No.: 160,512

Related U.S. Application Data

[63] Continuation-in-part of Ser. No. 849,519, Aug. 12, 1969, abandoned.

[30] Foreign Application Priority Data

| Aug. 16, 1968 | Japan | 43/58314 |
| Mar. 29, 1969 | Japan | 44/24116 |
| May 2, 1969 | Japan | 44/34163 |
| June 28, 1969 | Japan | 44/51159 |
| July 3, 1969 | Japan | 44/53391 |

[52] U.S. Cl............ 260/2 A, 252/431 P, 260/615 B
[51] Int. Cl............................................. C08g 23/14
[58] Field of Search........................ 260/2 A, 615 B

[56] References Cited
UNITED STATES PATENTS

| 3,208,955 | 9/1965 | Proops | 260/2 |
| 3,244,646 | 4/1966 | Naro et al. | 260/2 |
| 3,397,155 | 8/1966 | Naro et al. | 260/2 |
| 3,634,340 | 1/1972 | Gunther | 260/2 |

OTHER PUBLICATIONS

Chemical Abstracts 63, 10,072 b (1965)

*Primary Examiner*—William H. Short
*Assistant Examiner*—E. A. Nielsen
*Attorney*—Sherman and Shalloway

[57] ABSTRACT

A method for the polymerization of vicinal alkylene oxides using a polymerization catalyst which is the reaction product of an organotin compound (A) with an esterified product (B), the organotin compound (A) containing at least one tin-to-carbon bond in its molecule, and the esterified product (B) being a completely or partially esterified product of oxyacid of phosphorus or derivative thereof, or a combination of reactants capable of forming such ester or derivative.

5 Claims, No Drawings

PROCESS FOR THE POLYMERIZATION OF OXIDES AND CATALYST FOR THE POLYMERIZATION

This application is a continuation-in-part of application Ser. No. 849,519 filed on Aug. 12, 1969 now abandoned.

This invention relates to an improvement in the polymerization of copolymerization (which may be collectively referred to as polymerization hereinafter) of alkylene oxides, especially vicinal alkylene oxides. More particularly, the invention relates to an improved method for the polymerization of a vicinal alkylene oxide using improved polymerization catalysts, themselves and to such catalysts themselves. These catalysts are formed by the reaction of an organotin compound with a complete or partial ester of an oxyacid of phosphorus, a derivative thereof, or a combination of reactants capable of forming such ester or derivative. These catalysts exhibit excellent and high polymerization activity at relatively low temperatures, and also excellent stability. Thus the catalysts are easy to handle and allow an advantageous operation of polymerization. Furthermore, even when they are used in less quantities than those normally required for conventional catalysts, satisfactory results are obtainable, with the consequence that a still further advantage is obtained in that the additional procedure of eliminating the catalyst from the reaction product can be omitted. Still further, the catalysts are very excellent in reaction reproducibility and the intended polymers can be obtained with good quality reproducibility.

More specifically, this invention relates to a process for the polymerization of vicinal alkylene oxides, which comprises polymerizing or copolymerizing vicinal alkylene oxides in the presence of a heat-reaction product of (A) an organotin compound and (B) a complete or partial ester of an oxyacid of phosphorus, a derivative thereof, or a combination of reactants capable of forming such ester or derivative, the organotin compound (A) containing at least one tin-to-carbon bond in its molecule and being selected from the group consisting of the compounds of the following formulae through:

$$R_aSnX_b \quad (I)$$

wherein R is selected from the group consisting of (i) alkyl of one to 12 carbon atoms, (ii) alkenyl of two to 12 carbon atoms, (iii) aryl, (iv) aryl substituted by alkyl of one to four carbon atoms, (v) cycloalkyl of three to eight carbon atoms and (vi) aralkyl; X is selected from the group consisting of hydrogen, halogen, hydroxy, alkoxy, aryloxy, acyloxy, alkylthio, arylthio, alkylthio substituted by alkoxycarbonyl, alkylthio substituted by hydroxy, alkylthio substituted by acyloxy, alkoxy substituted by alkoxycarbonyl, alkoxy substituted by hydroxy, alkoxy substituted by acyloxy, acyloxy substituted by alkoxycarbonyl, acyloxy substituted by hydroxy, acyloxy substituted by acyloxy, aryloxy substituted by alkyl of one to four carbon atoms and arylthio substituted by alkyl of one to form carbon atoms; $a$ is an integer of 1 through 4; $b$ is an integer of 4 − $a$; and when $a$ is more than 1, R's may be the same or different, and when $a$ is 2 and X is selected from the group consisting of alkoxy, acyloxy and alkylthio, the two X's together may form a ring:

$$(R'_3Sn)_cX' \quad (II)$$

wherein R' is a member selected from the group consisting of R and X as defined in formula I, and at least one R' is selected from R; X' is selected from the group consisting of a carbonate radical, a radical of an oxyacid of phosphorus, polybasic polycarboxylic acid residues (alkane-di-oyl-oxy and alkane-poly-oyl-oxy), polyhydric alcohol residues (alkylene dioxy), polythiol residues (alkylene dithio), mercaptocarboxylic acid residues (thioalkanoyloxy), mercaptoalcohol residues (thioalkanoxy) and hydroxycarboxylic acid residues (oxyalkanoyloxy); and $c$ is an integer not less than 2 and corresponding to the basicity of the radical X':

$$R_dSnY_e \quad (III)$$

wherein R is as defined above; Y is a member selected from the group consisting of oxygen and sulfur atoms; and $d$ is 1 or 2, and when $d$ is 1, $e$ equals 3/2, and when $d$ is 2, $e$ equals 1; it being permissible for the compound of formula III to form a complex with a compound of formula I:

$$R'+SnR_2 - Y +_lSnR_2 - R' \quad (IV)$$

wherein R is as defined above, and each R is the same; Y is as defined above; R' is a member selected from the group consisting of R and X as defined in formula I and may be the same or different; and $l$ is an integer not less than 1; and $$+ SnR_2 - LML'+_{l'} \quad (V)$$

wherein R is as defined above and the two R's must be the same; L and L', which may be the same or different, are selected from the group consisting of oxygen, sulfur, and $$\begin{matrix} \text{O} \\ \| \\ -\text{C}-\text{O}- \end{matrix}$$

in which the carbon atom is bonded to M; M is a saturated or unsaturated aliphatic radical; $l'$ is an integer more than 1;

and component (B) being selected from the group consisting of complete or partial esters of a phosphorus oxyacid derived from compounds of the following fromulae 1 through 10, derivatives of such complete or partial esters, and combinations of reactants capable of forming such esters or derivatives:

1. $(HO)_3PO$;

(2) $(HO)_2P-O-P(OH)_2$;
    $\quad\ \ \|\qquad\quad\ \ \|$
    $\quad\ \ O\qquad\quad\ \ O$ (3) $\qquad\qquad\ \text{OH}$
    $\qquad\qquad\ \ \|$
    $(HO)_2P-O-P-O-P(OH)_2$;
    $\quad\ \ \|\qquad\ \ \|\qquad\ \ \|$
    $\quad\ \ O\qquad\ \ O\qquad\ \ O$ 4. $(HO)_3P$;
5. $(HO)_2POP(OH)_2$;
6. $Z(OH)_2PO$ in which Z is a member selected from the group consisting of alkyl of one to eight carbon atoms and phenyl;
7. $Z_2(HO)PO$ in which Z is as defined above;

(8) $\quad\ \ \text{OH}\quad\ \ \text{OH}$
    $\quad\ \ \ |\qquad\ \ \ |$
    $Z-P-O-P-Z$
    $\quad\ \ \|\qquad\ \ \|$
    $\quad\ \ O\qquad\ \ O$ in which Z is as defined above;
9. $Z(HO)_2P$ in which Z is as defined above; and
10. $Z_2(HO)P$ in which Z is as defined above.

The, the invention also relates to the catalysts described above.

It is known to practise polymerization of alkylene oxides in the presence of a catalyst, and various catalysts have been proposed for this purpose.

All of the known catalysts, however, are subject to one or more defects, and a catalyst which is satisfactory in all aspects such as polymerization activity, stability, facility in handling, quantity requirement, economic requirement, reaction reproducibility, etc., has not yet been proposed. Thus, the art has sought and still seeks such a catalyst, which will allow industrially advantageous practice of this catalytic reaction.

While a great many catalysts for the polymerization of alkylene oxides have been proposed, those receiving the most attention recently are the catalyst systems composed mainly of two or three organic metal compounds such as organic aluminum, zinc, magnesium compounds, etc. It has been proved that organic magnesium effective for compounds are the polymerization of ethylene oxide, and the catalyst systems composed chiefly of an organic zinc compound are useful almost exclusively for the polymerization of propylene oxide but they are particularly ineffective for halogen-substituted oxides such as epichlorohydrin. Catalyst systems composed mainly of an organic aluminum compound, for example, those obtained by reacting an organic aluminum compound with a limited amount of water, can achieve a high degree of polymerization in the polymerization of great varieties of alkylene oxides. However, these organic metal catalysts inclusive of those from mangesium and zinc, are by no means suitable for industrial use, because they are hazardous in handling and expensive and because they must be used in relatively large amounts in order to attain sufficient catalytic effects. For these reasons, development of a novel and improved catalyst has been greatly demanded in the art.

Various attempts have been made to polymerize alkylene oxides in the presence of metallic compounds other than organic metal compounds. With regard to tin compounds, the use of a complex of tin halogenide with a diamine has been proposed (German Pat. NO. 55,431,1967), the use of stannous carboxylate has been proposed (U.S. Pat. No. 2,933,459) and the use of a reaction product between stannous chloride and an alkylene oxide has been proposed (U.S. Pat. No. 3,248,347).

Techniques using phosphorus compounds have also been proposed. For instance, the use of phosphoric acid salts of melts such as titanium, zirconium, thorium, lead, vanadium, chromium, manganese, iron, etc has been proposed. (Chemical Abstracts, 63, 10,071 h − 10,072 b (1965) ), the use of a reaction product between phosphoric acid and a halide of a metal such as aluminum, gallium, indium, thallium, boron, etc has been proposed (U.S. Pat. No. 3,397,155), and the use of a reaction product between phosphoric acid and an alkoxide of a metal such as aluminum, gallium, indium, thallium, boron, etc has been proposed (U.S. Pat. No. 3,244,646).

These tin or phosphorus compounds are objectionable, however, in that the resulting polymers fail to have a high molecular weight, the catalyst activity is not applicable generally to alkylene oxides, and they must be used in large quantities.

Organotin compounds are very stable, unlike the above-mentioned organic compounds of metals of Groups II and III, but there is substantially no instance of using organotin compounds as polymerization catalysts. Only their polymerization activity for ethylene oxide was recently examined and the result was reported only as to dialkyltin dihalides. More specifically, it was reported that the polymerization of ethylene oxide in the presence of such organotin compound gives only a colored, wax-like low molecular weight polymer, though conducted under very severe conditions (J. Chem. Soc. Japan, Industrial Chemistry Section, 71, 2,054 (1968) ).

Research has been conducted with a view to developing catalysts for polymerization of alkylene oxides, which will meet all of the foregoing requirements, and it has now been found that reaction products between the above-mentioned organotin compound (A) and the specific phosphorus oxyacid ester component (B) selected from a complete or partial ester of an oxyacid of phosphorus, a derivative thereof and a combination of reactants capable of forming such ester or derivative, can exhibit an excellent catalytic activity for polymerization of alkylene oxides and are satisfactory in all of the above-mentioned requirements.

Accordingly, the primary object of this invention is to provide a catalyst for polymerization of an alkylene oxide, especially a vicinal alkylene oxide, which is industrially satisfactory in all such respects as polymerization activity, stability, facility in handling, amount of use, reaction reproducibility, etc., and to provide a process for the polymerization of an alkylene oxide, especially a vicinal alkylene oxide, with use of such polymerization catalyst.

Other objects and advantages of this invention will be apparent from the description given hereinbelow.

The above organotin compound (A) used for the preparation of the catalyst of this invention may be manufactured by known methods, and these organotin compounds (A) are known in the art (see, for example, G. E. Coates, *Organometallic Compounds*, first published in 1956, Butler & Tanner Ltd., Frome and London). The other catalyst component (B), namely a complete or partial ester of an oxyacid of phosphorus, its derivative or a combination of reactants capable of forming such ester or derivative, is also known.

The catalyst to be employed in this invention is a heat-reaction product between components (A) and (B), which is formed by heating components (A) and (B) while keeping them in contact. For instance, an organotin compound (A) and a complete or partial ester of an oxyacid of phosphorus or its derivative may be heated together while they are contacted with each other. When the organotin compound (A) is a compound of formula I in which X is hydroxy, alkoxy, aryloxy or substituted alkoxy, a compound of formula II in which X' is a polybasic polycarboxylic acid residue, polyhydric alcohol residue, mercaptoalcohol residue or hydroxycarboxylic acid residue, a compuond of formula III in which Y is oxygen, a compound of the formula IV in which Y is oxygen or a compuond of the formula V in which L and L' are oxygen or

the reaction between such organotin compound with a partial ester of an oxyacid of phosphorus is allowed to advance even without heating. Accordingly, in this case, the reaction is effected and then the resulting reaction product is heated to obtain the intended catalyst.

Moreover, it is possible to form a heat-reaction product comprising one atom or less of phosphorus per atom of tin and heat-react a mixture of the heat-reaction product with an additional amount of component (B), Furthermore, it is possible to employ as component (B) reactants capable of forming a complete or partial ester of an oxyacid of phosphorus or its derivative, react one of such reactants with the compound (A) and then react the resulting product with the other reactant. It is also possible to react the organotin compound (A) simultaneously with both of the ester-forming reactants. In case such ester-forming reactants are used as the component (B), it is indispensable to heat at least once a system in which all of of the organotin compound (A) and the ester-forming reactants (B) are contacted with one another. For instance, a method may be adapted comprising reacting a compound (A) with one of the ester-forming reactants (B) at room temperature, adding to the system the other ester-forming reactant and heating the same, or a method comprising reacting compound (A) at room temperature successively with the ester-forming reactants stepwise, and then heating the total system.

It must be noted that reaction products prepared by all of the above-mentioned manufacturing procedures are included in the scope of the heat-reaction product referred to herein.

According to this invention, the quantitative ratio of the components used for the preparation of the catalyst, i.e., the organotin compound (A) and the phosphorus oxyacid ester component (B) may be varied in a broad range. For example, the molar ratio of A : B may be varied from 1 : 50 to 50 : 1. A preferable molar ratio of A : b is within a range of from 1 : 10 to 10 : 1. When component (B) is a combination of ester-forming reactants, it is desired that the amount of phosphorus-containing reactant will satisfy the above molar ratio requirement, and the other reactant to be reacted with the phosphorus-containing reactant may be used in an amount within a broad range, e.g. 1 – 100 molar times the phosphorus-containing reactant.

It is preferred that the reaction between components (A) and (B) is performed so that the resulting heat-reaction product will comprise at least about one phosphorus atom per atom of tin. A heat-reaction product comprising phosphorus in an amount of more than one atom per atoms of tin is preferred.

The heat-reaction is usually conducted at temperatures ranging from about 80 to about 500°C., preferably from about 100 to about 400°C., especially preferably from about 150 to 300°C.

This reaction for the preparation of the catalyst is usually conducted in the absence of a solvent, but it is permissible to employ any suitable solvent. The reaction can be performed in the air, but, if desired, it is possible to conduct the reaction in an inert gas such as nitrogen. This procedure is necessary particularly when either component (A) or (B) is readily oxidized or has easily polymerizable functional groups. As suitable solvents aliphatic hydrocarbons such as heptane, hexane and kerosine, aromatic hydrocarbons such as benzene and toluene, halogenated aliphatic and aromatic hydrocarbons such as carbon tetrachloride, methylene chloride, 1,1,1-trichloroethane and chlorobenzene, ethers such as ethyl ether and propyl ether, and ketones such as acetone and methylethylketone may be exemalified.

The mechanism of the reaction of forming the catalyst, and the structure of the heat-reaction product have not been completely clarified as yet, but it is presumed that the reaction may progress in a manner of condensation while substances of relatively simple structures are released as components (A) and (B) are contacted and heated. For example, when compound (A) is an alkyltin halide, the volatile material distilled off from the reaction system includes alkanes, alkenes, alkanols and alkyl halides.

The heat-reaction product to be employed as the catalyst in this invention will now be detailed more specifically by referring to a specific example.

When tributyltin chloride [$(C_4H_9)_3SnCl$] is used as component (A), tributyl phosphate [$(C_4H_9)_3PO_4$] is used as component (B), and the two components are reacted at a molar ratio of A : B = 1 : 2, the resulting solid product weighs approximately 55 percent of the total weight of the starting compounds. When the product is dissolved in benzene and re-precipitated from hexane for purification, by elementary analysis it is confirmed that the purified product contains 34.5 percent of carbon and 6.5 percent of hydrogen. From these values, it is seen that the product is very close to $(C_4H_9)_4Sn(PO_4)_2$.

As described above, the reaction of forming the catalyst of this invention is presumed to progress in a manner of condensation while releasing substances of a simple structure. Thus, a change is observed in the molecular weight of the product depending on the degree of the progress of the catalyst-forming reaction. More specifically, as the reaction progresses, the average molecular weight of the catalyst increases, and finally a product is obtained in the state of a gel which is substantially insoluble. The catalytic activity for the polymerization is recognizable in each of the products obtained at different stages of the catalyst-forming reaction, i.e., during a period when the reaction product is still soluble and its molecular weight is low and even after the product has become insoluble Further, when any limited portion of the reaction product is isolated by means of fractional precipitation, it exhibits catalytic activity.

However, products obtained at different stages of the catalyst-forming reaction do not always exhibit a similar catalytic activity. The reason is that the degree of the condensation in the heat-reaction product may presumably influence its catalytic activity. The suitable degree of the condensation varies depending on the kinds of components (A) and (B), the reacting ratio thereof and other factors, and it can be readily determined based on experimental results. For instance, in the above-mentioned specific example of the reaction product obtained by selecting tributyltin chloride and tributyl hphosphate as components (A) and (B) and reacting them at the molar ratio of A : B = 1 : 2, a product in which the condensation progresses such that the carbon content determined by the elementary analysis is within a range of about 20 to about 38 percent exhibits good catalytic acitivity, and a tendency of decline of the catalytic activity is observed in either a product of a lower condensation degree, i.e., a higher carbon content, or a product of a higher condensation degree, i.e., a lower carbon content.

The resulting reaction product may be used as a catalyst as it is without further processing. If desired, however, the as-prepared product may be subjected to a suitable post-treatment, such as heating under reduced pressure, so as to remove unreacted esters, by-products and other volatile substances. The product also may be purified by conventional techniques such as washing with a suitable solvent, or dissolution and reprecipitation, and it may be ground prior to use. When the catalyst is partially soluble in an aromatic hydrocarobn, an aliphatic ether, a halogenated hydrocarbon or the like, depending on the degree of condensation, the soluble portion alone may be separated in such solvent and used as the catalyst as it is in the solution form, or it may be used after the removal of the solvent by maintaining the solution under reduced pressure or heating it under reduced pressure. Further, such solvent solution of the soluble portion of the product may be incorporated with a suitable non-solvent to reprecipitate the solid to be used as a catalyst. It is also possible to remove the soluble portion and use the insoluble portion along as a catlyyst. As the solvent suitably used for separating the soluble portion from the reaction product, aromatic hydrocarbons such as benzene and toluene, and halogenated hydrocarbons such as chloroform and methylene chloride may be named. Examples of the non-solvent to be used for precipitation are hexane, heptane and acetone.

The catalyst of this invention exhibits excellent stability and can be stored in the presence of air for a long period without any substantial reduction in its catalytic activity. In case moisture absorption is observed in the catalyst, the activity of the catalyst can be easily regenerated by heating the catalyst under reduced pressure. The presence of a very minor amount of the catalyst is effective for quickly polymerizing various alkylene oxides, especially vicinal alkylene oxides, at low temperatures below 30°C. to high degrees of polymerization. For example, while a catalyst composed mainly of organoaluminum, one of conventional catalysts most useful for polymerization of alkylene oxides, is normally used in an amount of 1– 5 percent by weight based on the monomer to be polymerized, the use of the catalyst of this invention in such a small amount as 0.5 – 0.01 percent by weight based on the monomer or less is sufficient to advance the polymerization at sufficiently practical rates. Furthermore, the catalyst of this invention can be used in the state exposed to air with substantially no degradation of its catalytic activity, unlike conventional organoaluminum catalysts which are difficult to handle. Moreover, even if the catalyst is left in the resulting polymer, it has no practical adverse effect on the physical properties of the polymer because the amount of catalyst used is very small, and the catalyst need not be removed from the polymer by additional procedures.

In this invention, sufficient results can be attained by using the catalyst in an amount of 0.5 – 0.001 percent by weight based on the alkylene oxide monomer, as described hereinabove. If desired, the catalyst may used in a greater amount. For instance, the catalyst may be used in an amount of 0.001 – 5.0 percent by weight, preferably 0.01 – 2.0 percent by weight, more preferably less than 1.0 percent by weight. In most usual cases, the catalyst is used in an amount ranging from 0.05 percent by weight to 0.5 percent by weight, based on the alkylene oxide monomer.

Among the organotin compound (A) to be used for the catalyst preparation in accordance with this invention, as to the compound of formula I, those in which R is selected from the group consisting of alkyl of one to eight carbon atoms, (ii) alkenyl of two to four carbon atoms, (iii) phenyl or naphthyl, (iv) phenyl or naphthyl substituted by alkyl of one to four carbon atoms, especially substituted by methyl, (V) cycloalkyl of five to six carbon atoms and (vi) phenyl-substituted lower alkyl (for example, benzyl and phenylethyl); and X is selected from the group consisting of hydrogen, halogen, hydroxy, alkoxy of one to 20 carbon atoms, phenoxy or naphthoxy or phenoxy substituted by lower alkyl of one to three carbon atoms, acyloxy derived from fatty acid of one to 18 carbon atoms, alkylthio of one to 12 carbon atoms, phenylthio, naphthylthio, methyl-substituted phenylthio or naphthylthio, alkylthio of one to 12 carbon atoms, especially one to eight carbon atoms, substituted by alkoxycarbonyl having one to four carbon atoms in the alkoxy moiety, alkylthio of one to 12 carbon atoms, especially one to eight carbon atoms, substituted by hydroxy, alkylthio of one to 12 carbon atoms, especially one to eight carbon atoms, substituted by acyloxy derived from fatty acid of one to 18 carbon atoms, alkoxy of one to 12 carbon atoms, especially one to eight carbon atoms, substituted by alkoxycarbonyl having one to four carbon atoms in the alkoxy moiety, alkoxy of one to 12 carbon atoms, especially one to eight carbon atoms, substituted by hydroxy, acyloxy of one to eight carbon atoms substituted by hydroxy, alkoxy of one to 12 carbon atoms, especially one to eight carbon atoms, substituted by acyloxy derived from fatty acid of one to 18 carbon atoms, acyloxy substituted by alkoxycarbonyl having one to eight carbon atoms in the alkoxy moiety, and acyloxy of one 18 carbon atoms substituted by acyloxy derived from fatty acid of one to 18 carbon atoms are preferred.

The following organotin compounds are examples of the compounds of formula I:

$(C_6H_5)_4Sn$, $(C_2H_5)_4Sn$, $(CH_2=CH)_4Sn$, $(CH_3)_3C_6H_5Sn$, (para-, meta or ortho-$CH_3C_6H_4)_4Sn$, $(1\text{-}C_{10}H_7)_4Sn$, (cyclo-$C_6H_{11})_4Sn$, $(C_6H_5CH_2)_4Sn$, $(C_6H_5)Sn(CH=CH_2)_3$, $(CH_2=CHCH_2)Sn(C_2H_5)_3$, $(C_6H_5)_3SnH$, $(C_6H_5CH_2)_3SnH$, $(C_4H_9)_3SnH$, $(C_8H_{17})_3SnH$, $(C_4H_9)_2SnH_2$, $(C_5H_{11})_2SnH_2$, $(C_6H_5)_2SnH_2$, $(CH_3)_3SnF$, $(C_2H_5)_3SnF$, (n- or iso-$C_3H_7)_3SnF$, (n-, iso-, or tert-$C_4H_9)_3SnF$, $(C_6H_{13})_3SnF$, $(C_8H_{17})_3SnF$, $(C_6H_5)_3SnF$, $(C_6H_5CH_2)_3SnF$, $(CH_2=CH)_3SnF$, (cyclo-$C_6H_{11})_3SnF$, $(C_6H_5CH_2)(C_6H_5)(C_2H_5)SnF$, $(CH_3)_3SnCl$, $(C_2H_5)_3SnCl$, (n- or iso-$C_3H_7)_3SnCl$, (n-, iro or tert-$C_4H_9)_3SnCl$, $(C_6H_{13})_3SnCl$, $(C_8H_{17})_3SnCl$, $(C_{12}H_{23})_3SnCl$, $(C_6H_5)_3SnCl$, $(C_6H_5CH_2)_3SnCl$, $(CH_2=CH)_3SnCl$, $(CH_2=CHCH_2)_3SnCl$, (para-, meta or ortho-$CH_3C_6H_4)_3SnCl$, $(1\text{-}C_{10}H_7)_3SnCl$, $[2,5\text{-}(CH_3)_2C_6H_5]_3SnCl$, (cyclo-$C_6H_{11})_3SnCl$, $(C_4H_9)(CH_3)_2SnCl$, $(C_4H_9)($cyclo-$C_6H_{11})_2SnCl$, (para-$CH_3C_6H_4CH_2)_3SnCl$, $(CH_3)_3SnBr$, $(C_2H_5)_3SnBr$, (n- or iso-$C_3H_7)_3$SnBr, (n-, or iso- $C_4H_9)_3$SnBr, $(C_6H_{13})_3$SnBr, $(C_8H_7)_3$SnBr, $(C_6H_5)_3$SnBr, $(C_6H_5CH_2)_3$SnBr, $(CH_2=CHCH_2)_3$SnBr, (ortho-, or para-CH_3C_6H_4)_3$SnBr, [2.5-$(CH_3)_2C_6H_3]_3$SnBr, (cyclo-$C_6H_{11})_3$SnBr, $(C_6H_5)_2(CH_2=CHCH_2)$SnBr, $(C_2H_5)_2(C_{12}H_{23})$SnBr, $(CH_3)_3$SnI, $(C_2H_5)_3$SnI, (n- or iso-$C_3H_7)_3$SnI, (n or iso-$C_4H_9)_3$SnI, $(C_5H_{11})_3$SnI, $(C_6H_{13})_3$SnI, $(C_8H_{17})_3$SnI, $(C_6H_5)_3$SnI, $(C_6H_5CH_2)_3$SnI, (iso-$C_3H_7)_3$SnI, (iso-$C_4H_9)_3$SnI, (ortho-, or para-CH_3C_6H_4)_3$SnI, (cyclo-$C_6H_{11})_3$SnI, (sec. $C_4H_9$) $(CH_3)_2$SnI, $(C_6H_5)_2(C_6H_5CH_2CH_2)$SnI, $(CH_3)_2$SnF_2, $(C_2H_5)_2$SnF_2, (n- or iso- $C_3H_7)_2$SnF_2, (n-, iso- or tert.-$C_4H_9)_2$SnF_2, n-, iso or tert-$(C_5H_{11})_2$SnF_2, $(C_6H_{13})_2$SnF_2, $(C_8H_{17})_2$SnF_2, $(C_6H_5)_2$SnF_2, $(C_6H_5CH_2)_2$SnF_2, $(CH_2=CH)_2$SnF_2, (cyclo-$C_6H_{11})_2$SnF_2, $(CH_3)_2$SnCl_2, $(C_2H_5)_2$SnCl_2, (n- or iso-$C_3H_7)_2$SnCl_2, (n-, iso- or tert.-$C_4H_9)_2$SnCl_2, (n-, iso- or tert.-$C_5H_{11})_2$SnCl_2, $(C_6H_{13})_2$SnCl_2, $(C_8H_{17})_2$SnCl_2, $(C_6H_5)_2$SnCl_2, $(C_6H_5CH_2)_2$SnCl_2, $(C_{12}H_{25})_2$SnCl_2, $(CH_2=CH)_2$SnCl_2, $(CH_2=CHCH_2)_2$SnCl_2, (ortho-, meta- or para-CH_3C_6H_4)_2$SnCl_2, (1- or 2-$C_{10}H_7)_2$SnCl_2, (9-$C_{14}H_{10})_2$SnCl_2, (cyclo-$C_5H_9)_2$SnCl_2, (cyclo-$C_6H_{11})_2$SnCl_2, $(C_4H_9)(C_3H_7)$SnCl_2, $(C_4H_9)(C_6H_5)$SnCl_2, $(C_6H_5)(CH_2=CH)$SnCl_2, $(CH_3)_2$SnBr_2, $(C_2H_5)_2$SnBr_2, (n- or iso-$C_3H_7)_2$SnBr_2, (n-, iso- or tert.-$C_4H_9)_2$SnBr_2, (n-, iso- or tert.-$C_5H_{11})_2$SnBr_2, $(C_6H_{13})_2$SnBr_2, $(C_8H_{17})_2$SnBr_2, $(C_6H_5)_2$SnBr_2, $(C_6H_5CH_2)_2$SnBr_2, $(C_4H_9)$SnBrCl, $(C_6H_5)_2$SnBrI, $[(CH_2)_5 SnBr_2]$, $(CH_2=CH)_2$SnBr_2, $(CH_2=CHCH_2)_2$SnBr_2, $(CH_3CH=CH_2)_2$SnBr_2, (ortho-, meta- or para-CH_3C_6H_4)_2$SnBr_2, (1- or 2-$C_{10}H_7)_2$SnBr_2, (cyclo-$C_5H_9)_2$SnBr_2, (cyclo-$C_6H_{11})_2$SnBr_2, $(C_2H_5)(CH_2=CH)$SnBr_2, $(C_6H_5CH_2)(C_6H_5)$SnBr_2, $(CH_3)_2$SnI_2, $(C_2H_5)_2$SnI_2, (n- or iso-$C_3H_7)_2$SnI_2, (n-, iso- or tert.-$C_4H_9)_2$SnI_2, (n-, iso- or tert.-$C_5H_{11})_2$SnI_2, $(C_6H_{13})_2$SnI_2, $(C_8H_{17})_2$SnI_2, $(C_6H_5)_2$SnI_2, $(C_6H_5CH_2)_2$SnI_2, $(CH_2=CH)_2$SnI_2, (1- or 2-$C_{10}H_7)_2$SnI_2, (cyclo-$C_6H_{11})_2$SnI_2, $C_4H_9$SnF_3, $C_6H_5$SnF_3, $C_{12}H_{23}$SnF_3, $CH_3$SnCl_3, $C_2H_5$SnCl_3, n- or iso-$C_3H_7$SnCl_3, n-, iso- or tert.-$C_4H_9$SnCl_3, $C_6H_{13}$SnCl_3, $C_8H_{17}$SnCl_3, $C_6H_5$SnCl_3, (ortho-, meta- or para-CH_3C_6H_4)$SnCl_3, 1-$C_{10}H_7$SnCl_3, $CH_2$=CHSnCl_3, $C_6H_5CH_2CH_2$SnCl_3, $CH_3$SnBr_3, $C_2H_5$SnBr_3, n- or iso-$C_3H_7$SnBr_3, $C_4H_9$SnBr_3, $C_6H_5$SnBr_3, $CH_2$=CHSnBr_3, $CH_2$=CHCH_2$SnBr_3, $CH_3$SnI_3, $C_2H_5$SnI_3, n- or iso-$C_3H_7$SnI_3, $C_6H_5$SnI_3, $(CH_3)_3$SnOC_2H_5, $(C_2H_5)_3$SnOCH_2C_6H_5, $(C_4H_9)_3$SnOC_4H_9, $(C_4H_9)_3$SnOC_{12}H_{25}, $(C_2H_5)_3$SnOC_6H_5, $(C_8H_{17})_3$SnOCH_3, $(CH_2=CH)_3$SnOC_4H_9, $(CH_2=CH)_3$SnOC_6H_5, $(C_6H_5)_3$SnOCH_3, $(C_6H_5)_3$SnOC_6H_5, $(C_6H_5CH_2)_3$SnOC_4H_9, $(C_6H_5CH_2)_3$SnOC_6H_5, (cyclo-$C_6H_{11})_3$SnOC_8H_{17}, (cyclo-$C_6H_{11})_3$SnOC_6H_5, $(CH_3)_2$Sn(OC_{12}H_{23})_2, (n- or iso-$C_3H_7)_2$Sn(OC_4H_9)_2, $(C_6H_5)_2$Sn(OC_2H_5)_2, (cyclo-$C_6H_{11})_2$Sn(OC_3H_7)_2, $(C_2H_5)_2$Sn(OC_6H_5)_2, (cyclo-$C_6H_{11})_2$Sn(OC_6H_5)_2, $(C_4H_9)_2$Sn(OCH_2CH=CH_2)_2, $(CH_2=CH)_2$Sn(OC_4H_9)_2, $(CH_2=CH)_2$Sn(OC_6H_5)_2, $(CH_3)_2$Sn(OC_{12}H_{23})_2, $(C_8H_{17})_2$Sn(OCH_3)_2, $(C_4H_9)_2Sn\begin{pmatrix}O-CH_2\\|\\O-CH_2\end{pmatrix}$, $(C_4H_9)_2Sn\begin{pmatrix}O-CH_2\\|\quad CH_2\\O-CH_2\end{pmatrix}$, $(C_4H_9)_2Sn\begin{pmatrix}O-CHCOOC_4H_9\\|\\O-CHCOOC_4H_9\end{pmatrix}$, $(C_4H_9)_2Sn\begin{pmatrix}O-CH_2\\|\\O-C-CH_2OCOC_{11}H_{23}\\|\\H\end{pmatrix}$, $(CH_2=CHCH_2)_2Sn\begin{pmatrix}OC_4H_9\\Cl\end{pmatrix}$, $(C_2H_5)_2Sn\begin{pmatrix}OC_2H_5\\F\end{pmatrix}$, $(C_4H_9)_2Sn\begin{pmatrix}O-C(CH_3)_2-COOC_2H_5\end{pmatrix}_2$, $(C_4H_9)_2$Sn(OCH_2CH_2OH)_2, $(CH_3)_3$Sn(OCOCH_3), $(C_2H_5)_3$Sn(OCOCH_3), (n or iso-$C_3H_7)_3$Sn(OCOCH_3), $(C_4H_9)_3$Sn(OCOCH_3), $(C_6H_{13})_3$Sn(OCOCH_3), $(C_8H_{17})_3$Sn(OCOCH_3), $(C_6H_5)_3$Sn(OCOCH_3), $(C_6H_5CH_2)_3$Sn(OCOCH_3), $(CH_3)_2$Sn(OCOCH_3)_2, $(C_2H_5)_2$Sn(OCOCH_3)_2, (n-or iso-$C_3H_7)_2$Sn(OCOCH_3)_2, $(C_4H_9)_2$Sn(OCOCH_3)_2, $(C_6H_{13})_2$Sn(OCOCH_3)_2, $(C_8H_{17})_2$Sn(OCOCH_3)_2, $(C_6H_5)_2$Sn(O(OCH_3)_2, $(C_4H_9)_2Sn\begin{pmatrix}OCO-CH\\||\\OCO-CH\end{pmatrix}$, $(C_6H_5)_2Sn\begin{pmatrix}OCO-CH\\||\\OCO-CH\end{pmatrix}$, $(C_8H_{17})_2Sn\begin{pmatrix}OCO-CH\\||\\OCO-CH\end{pmatrix}$, $(CH_2=CH)_3$Sn(OCOCH_3), (cyclo-$C_6H_{11})_3$Sn(OCOCH_3), $(C_2H_5)_3$Sn(OCOH), $(C_4H_9)_3$Sn(OCOC_{11}H_{23}), $(C_4H_9)_3$Sn[OCO(CH_3)C=CH_2], $(C_3H_7)_3$Sn(OCOCH=CH_2), $(C_2H_5)_3$Sn(OCOC_6H_5), (iso-$C_4H_9)_3$Sn(OCOC_5H_{11}), $(C_4H_9)_3$Sn(OCOCH=CH-COOC_4H_9), $(C_8H_{17})_3$Sn(OCOCH=CHCOOC_2H_5), $(C_6H_5)_3$Sn(OCOC_{11}H_{23}), $(C_6H_5CH_2)_3$Sn(OCOC_6H_5), (cyclo-$C_6H_{11})_3$Sn(OCOC_{17}H_{35}), (cyclo-$C_6H_{11})_3$Sn(OCOC_6H_5), $(C_3H_7)(C_6H_5)_2$Sn(OCOCH_3), $(C_4H_9)_2$Sn(OCOH)_2, $(C_2H_5)_3$SnOCOCH_2OH, $(C_2H_5)_3$SnOCOCH_2COOH, $(C_2H_5)_3$SnOCOCH=CH-COOH, $(C_4H_9)_2$Sn(OCOC_{11}H_{23})_2, $(C_8H_{17})_2$Sn(OCOC_{17}H_{35})_2, $(CH_3)_2$Sn(OCOC_6H_5)_2, $(CH_3)_2$Sn(OCOC_3H_7)_2, $(CH_3)_2$Sn[OCO(CH_3)C=CH_2]_2, $(C_8H_{17})_2$Sn(OCOH)_2, $(CH_2=CH)_2$Sn(OCOCH_3), (cyclo-$C_6H_{11})_2$Sn(OCOCH_3)_2, $(C_6H_5CH_2)_2$Sn(OCOC_4H_{19})_2, $(C_4H_9)_2$Sn(OCOCH=CHCOOC_4H_9)_2, $(C_4H_9)_2$Sn(OCOCH=CHCOOC_8H_{17})_2, $(C_8H_{17})_2$Sn(OCOCH=CHCOOC_4H_9)_2, $(C_4H_9)_2Sn\begin{pmatrix}OCO\\\\OCO\end{pmatrix}(CH_2)_4$, $(C_2H_5)_2Sn\begin{pmatrix}OCO-CHOH\\|\\OCO-CHOH\end{pmatrix}$, $(CH_2=CH)_2\begin{pmatrix}OCO\\\\OCO\end{pmatrix}C_6H_4$, $(C_6H_5CH_2)_2Sn\begin{pmatrix}Cl\\OCOCH=CH_2\end{pmatrix}$, $(CH_3)_2Sn\begin{pmatrix}Br\\OCOCH_3\end{pmatrix}$, $(cyclo-C_6H_{11})_2Sn\begin{pmatrix}Cl\\OCOC_{11}H_{23}\end{pmatrix}$, $(C_4H_9)_2Sn\begin{pmatrix}OCH_3\\OCOCH_3\end{pmatrix}$,

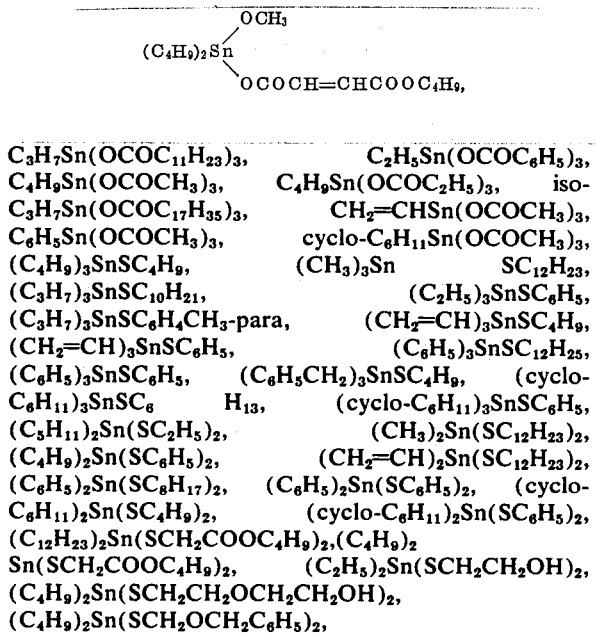

C$_3$H$_7$Sn(OCOC$_{11}$H$_{23}$)$_3$, C$_2$H$_5$Sn(OCOC$_6$H$_5$)$_3$, C$_4$H$_9$Sn(OCOCH$_3$)$_3$, C$_4$H$_9$Sn(OCOC$_2$H$_5$)$_3$, iso-C$_3$H$_7$Sn(OCOC$_{17}$H$_{35}$)$_3$, CH$_2$=CHSn(OCOCH$_3$)$_3$, C$_6$H$_5$Sn(OCOCH$_3$)$_3$, cyclo-C$_6$H$_{11}$Sn(OCOCH$_3$)$_3$, (C$_4$H$_9$)$_3$SnSC$_4$H$_9$, (CH$_3$)$_3$Sn SC$_{12}$H$_{23}$, (C$_3$H$_7$)$_3$SnSC$_{10}$H$_{21}$, (C$_2$H$_5$)$_3$SnSC$_6$H$_5$, (C$_3$H$_7$)$_3$SnSC$_6$H$_4$CH$_3$-para, (CH$_2$=CH)$_3$SnSC$_4$H$_9$, (CH$_2$=CH)$_3$SnSC$_6$H$_5$, (C$_6$H$_5$)$_3$SnSC$_{12}$H$_{25}$, (C$_6$H$_5$)$_3$SnSC$_6$H$_5$, (C$_6$H$_5$CH$_2$)$_3$SnSC$_4$H$_9$, (cyclo-C$_6$H$_{11}$)$_3$SnSC$_6$H$_{13}$, (cyclo-C$_6$H$_{11}$)$_3$SnSC$_6$H$_5$, (C$_5$H$_{11}$)$_2$Sn(SC$_2$H$_5$)$_2$, (CH$_3$)$_2$Sn(SC$_{12}$H$_{23}$)$_2$, (C$_4$H$_9$)$_2$Sn(SC$_6$H$_5$)$_2$, (CH$_2$=CH)$_2$Sn(SC$_{12}$H$_{23}$)$_2$, (C$_6$H$_5$)$_2$Sn(SC$_8$H$_{17}$)$_2$, (C$_6$H$_5$)$_2$Sn(SC$_6$H$_5$)$_2$, (cyclo-C$_6$H$_{11}$)$_2$Sn(SC$_4$H$_9$)$_2$, (cyclo-C$_6$H$_{11}$)$_2$Sn(SC$_6$H$_5$)$_2$, (C$_{12}$H$_{23}$)$_2$Sn(SCH$_2$COOC$_4$H$_9$)$_2$, (C$_4$H$_9$)$_2$Sn(SCH$_2$COOC$_4$H$_9$)$_2$, (C$_2$H$_5$)$_2$Sn(SCH$_2$CH$_2$OH)$_2$, (C$_4$H$_9$)$_2$Sn(SCH$_2$CH$_2$OCH$_2$CH$_2$OH)$_2$, (C$_4$H$_9$)$_2$Sn(SCH$_2$OCH$_2$C$_6$H$_5$)$_2$,

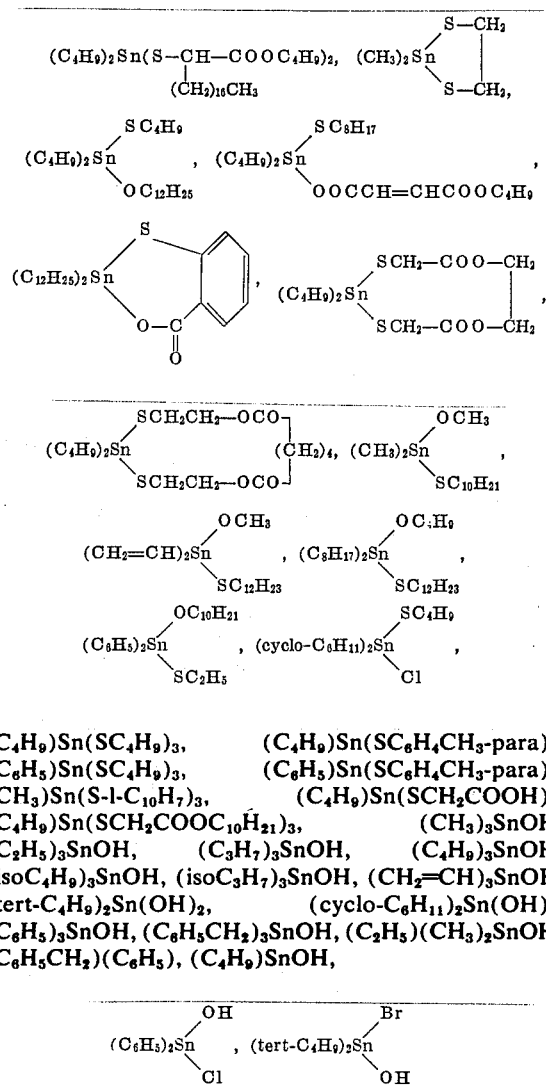

(C$_4$H$_9$)Sn(SC$_4$H$_9$)$_3$, (C$_4$H$_9$)Sn(SC$_6$H$_4$CH$_3$-para)$_3$, (C$_6$H$_5$)Sn(SC$_4$H$_9$)$_3$, (C$_6$H$_5$)Sn(SC$_6$H$_4$CH$_3$-para)$_3$, (CH$_3$)Sn(S-1-C$_{10}$H$_7$)$_3$, (C$_4$H$_9$)Sn(SCH$_2$COOH)$_3$, (C$_4$H$_9$)Sn(SCH$_2$COOC$_{10}$H$_{21}$)$_3$, (CH$_3$)$_3$SnOH, (C$_2$H$_5$)$_3$SnOH, (C$_3$H$_7$)$_3$SnOH, (C$_4$H$_9$)$_3$SnOH, (isoC$_4$H$_9$)$_3$SnOH, (isoC$_3$H$_7$)$_3$SnOH, (CH$_2$=CH)$_3$SnOH, (tert-C$_4$H$_9$)$_2$Sn(OH)$_2$, (cyclo-C$_6$H$_{11}$)$_2$Sn(OH)$_2$, (C$_6$H$_5$)$_3$SnOH, (C$_6$H$_5$CH$_2$)$_3$SnOH, (C$_2$H$_5$)(CH$_3$)$_2$SnOH, (C$_6$H$_5$CH$_2$)(C$_6$H$_5$), (C$_4$H$_9$)SnOH,

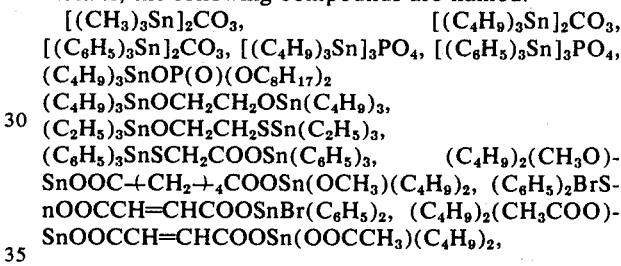

Among compounds of formula II those in which R' is a member selected from those recited above as R and X with respect to the formula I, and X' is selected from the group consisrinf of carbonic radical; radical of a phosphorus oxyacid selected from phosphoric radical, phosphonic radical and partially esterified phosphoric acid radical; radical of a dibasic carboxylic acid of two to 12 carbon atoms; radical of a tribasic carboxylic acid of three to 12 carbon atoms; radical of a tetracarboxylic acid of four to 12 carbon atoms; a polybasic polycarboxylic acid residue derived from a homopolymer of an unsaturated carboxylic acid or a copolymer of an unsaturated carboxylic acid with a vinyl monomer, especially a polybasic polycarboxylic acid residue derived from a homopolymer of acrylic or methacrylic acid or a copolymer thereof with a vinyl monomer (e.g., ethylene, allyl esters, vinyl esters and halogenated allyl), a copolymer of maleic or fumaric acid with such vinyl monomer, and a copolymer of acrylic or methacrylic acid, maleic or fumaric acid and such vinyl monomer; a polyhydric alcohol residue of two to four carbon atoms; a polythiol residue of two to four carbon atoms; a mercaptocarboxylic acid residue of two to 18 carbon atoms; and a hydroxycarboxylic acid residue of two to eight carbon atoms are preferred.

As examples of such compounds represented by formula II, the following compounds are named:
[(CH$_3$)$_3$Sn]$_2$CO$_3$, [(C$_4$H$_9$)$_3$Sn]$_2$CO$_3$, [(C$_6$H$_5$)$_3$Sn]$_2$CO$_3$, [(C$_4$H$_9$)$_3$Sn]$_3$PO$_4$, [(C$_6$H$_5$)$_3$Sn]$_3$PO$_4$, (C$_4$H$_9$)$_3$SnOP(O)(OC$_8$H$_{17}$)$_2$ (C$_4$H$_9$)$_3$SnOCH$_2$CH$_2$OSn(C$_4$H$_9$)$_3$, (C$_2$H$_5$)$_3$SnOCH$_2$CH$_2$SSn(C$_2$H$_5$)$_3$, (C$_6$H$_5$)$_3$SnSCH$_2$COOSn(C$_6$H$_5$)$_3$, (C$_4$H$_9$)$_2$(CH$_3$O)-SnOOC-(-CH$_2$-)$_4$COOSn(OCH$_3$)(C$_4$H$_9$)$_2$, (C$_6$H$_5$)$_2$BrSnOOCCH=CHCOOSnBr(C$_6$H$_5$)$_2$, (C$_4$H$_9$)$_2$(CH$_3$COO)-SnOOCCH=CHCOOSn(OOCCH$_3$)(C$_4$H$_9$)$_2$,

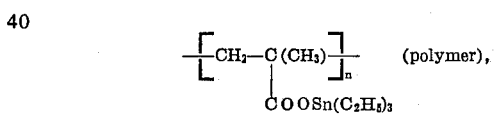

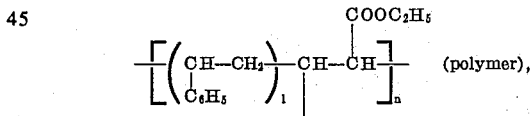

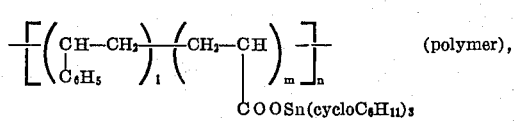

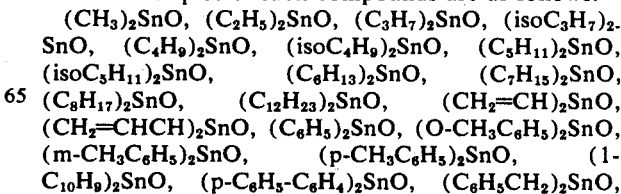

and
(C$_4$H$_9$)$_3$SnOCH$_2$CH$_2$COOSn(C$_4$H$_9$)$_3$.

Among compounds of formula III those in which R is a member selected from those recited above with respect to the formula I and Y stands for oxygen are preferred. Examples of such compounds are as follows:
(CH$_3$)$_2$SnO, (C$_2$H$_5$)$_2$SnO, (C$_3$H$_7$)$_2$SnO, (isoC$_3$H$_7$)$_2$SnO, (C$_4$H$_9$)$_2$SnO, (isoC$_4$H$_9$)$_2$SnO, (C$_5$H$_{11}$)$_2$SnO, (isoC$_5$H$_{11}$)$_2$SnO, (C$_6$H$_{13}$)$_2$SnO, (C$_7$H$_{15}$)$_2$SnO, (C$_8$H$_{17}$)$_2$SnO, (C$_{12}$H$_{23}$)$_2$SnO, (CH$_2$=CH)$_2$SnO, (CH$_2$=CHCH)$_2$SnO, (C$_6$H$_5$)$_2$SnO, (O-CH$_3$C$_6$H$_5$)$_2$SnO, (m-CH$_3$C$_6$H$_5$)$_2$SnO, (p-CH$_3$C$_6$H$_5$)$_2$SnO, (1-C$_{10}$H$_9$)$_2$SnO, (p-C$_6$H$_5$-C$_6$H$_4$)$_2$SnO, (C$_6$H$_5$CH$_2$)$_2$SnO, (cycloC$_6$H$_{11}$)$_2$SnO, (C$_2$H$_5$)(CH$_3$)SnO, (C$_2$H$_5$)(C$_6$H$_5$)SnO, CH$_3$SnO$_{3/2}$, C$_4$H$_9$SnO$_{3/2}$, C$_6$H$_5$SnO$_{3/2}$, (CH$_3$)$_2$SnS, (C$_2$H$_5$)$_2$SnS, (C$_3$H$_7$)$_2$SnS, (C$_4$H$_9$)$_2$SnS, (C$_8$H$_{17}$)$_2$SnS, (C$_6$H$_5$)$_2$SnS, (m-CH$_3$C$_6$H$_5$)$_2$SnS, (C$_6$H$_5$CH$_2$)$_2$SnS, (cyclo C$_6$H$_{11}$)$_2$SnS, CH$_3$SnS$_{3/2}$ and C$_6$H$_5$SnS$_{3/2}$.

Further, compounds of formula III may form complexes with compounds of formula I. These complexes are known from, for instance, Chem. Rev. pp. 508 – 509 (1960). Examples of such complexes are as follows:

R$_2$SnO·R$_2$SnX$_2$ compounds:
  (CH$_3$)$_2$SnO·(C$_2$H$_5$)$_2$SnI$_2$
  (CH$_3$)$_2$SnO·(C$_3$H$_7$)$_2$SnBr$_2$
  (C$_2$H$_5$)$_2$SnO·(CH$_3$)$_2$SnI$_2$
  (C$_2$H$_5$)$_2$SnO·(C$_2$H$_5$)$_2$SnBr$_3$
  (C$_2$H$_5$)$_2$SnO·(C$_2$H$_5$)$_2$SnCl$_2$
  (C$_2$H$_5$)$_2$SnO·(C$_2$H$_5$)$_2$SnI$_2$
  (C$_2$H$_5$)$_2$SnO·(C$_2$H$_7$)$_2$SnBr$_2$
  (C$_3$H$_7$)$_2$SnO·(C$_2$H$_5$)$_2$SnBr$_2$
  (C$_3$H$_7$)$_2$SnO·(C$_3$H$_7$)$_2$SnBr$_2$
  (C$_3$H$_7$)$_2$SnO·(C$_3$H$_7$)$_2$SnCl$_2$ R$_2$SnO·R$_2$SnIOH compounds:
  (CH$_3$)$_2$SnO·(CH$_3$)$_2$SnIOH
  (C$_2$H$_5$)$_2$SnO·(C$_2$H$_5$)$_2$SnIOH
  (iso-C$_3$H$_7$)$_2$SnO·(iso-C$_3$H$_7$)$_2$SnIOH
  (iso-C$_4$H$_9$)$_2$SnO·(iso-C$_4$H$_9$)$_2$SnIOH
  (iso-C$_6$H$_{11}$)$_2$SnO·(iso-C$_6$H$_{11}$)$_2$SnIOH R$_2$SnO·R$_2$Sn(OCOCH$_3$)$_2$ compounds:
  (CH$_3$)$_2$SnO·(CH$_3$)$_2$Sn(OCOCH$_3$)$_2$ (R$_2$SnO)$_2$·R$_2$SnX$_2$ compounds:
  [(CH$_3$)$_2$SnO]$_2$·(CH$_3$)$_2$SnCl$_2$ H(R$_2$SnO)$_3$OH·R$_2$SnX$_2$ compounds:
  H[(CH$_3$)$_2$SnO]$_3$OH·(CH$_3$)$_2$SnBr$_2$
  H[(CH$_3$)$_2$SnO]$_3$OH·(CH$_3$)$_2$SnI$_2$
  H[(C$_2$H$_5$)$_2$SnO]$_3$OH·(C$_2$H$_5$)$_2$SnBr$_2$ H[(C$_2$H$_5$)$_2$SnO]$_3$OH·(C$_2$H$_5$)$_2$SnCl$_2$ H[(C$_2$H$_5$)$_2$SnO]$_2$OH·(C$_2$H$_5$)$_2$SnI$_2$
  H[(C$_3$H$_7$)$_2$SnO]$_2$OH·(C$_3$H$_7$)$_2$SnI$_2$
  H[(C$_2$H$_5$)$_2$SnO]$_3$OH·(CH$_3$)$_2$SnI$_2$ R'(R$_2$SnO)$_3$OR'·R$_2$SnX$_2$ compounds:
  CH$_3$[(CH$_3$)$_2$SnO]$_3$OCH$_3$·(CH$_3$)$_2$SnBr$_2$
  CH$_3$[(CH$_3$)$_2$SnO]$_3$OCH$_3$·(CH$_3$)$_2$SnI$_2$
  C$_2$H$_5$[(CH$_3$)$_2$SnO]$_3$OC$_2$H$_5$·(CH$_3$)$_2$SnBr$_2$
  C$_2$H$_5$[(CH$_3$)$_2$SnO]$_3$OC$_2$H$_5$·(CH$_3$)$_2$SnI$_2$
  C$_2$H$_5$[(C$_2$H$_5$)$_2$SnO]$_3$OC$_2$H$_5$·(C$_2$H$_5$)$_2$SnBr$_2$
  C$_2$H$_5$[(C$_2$H$_5$)$_2$SnO]$_3$OC$_2$H$_5$·(C$_2$H$_5$)$_2$SnCl$_2$
  C$_2$H$_5$[(C$_2$H$_5$)$_2$SnO]$_3$OC$_2$H$_5$·(C$_2$H$_5$)$_2$SnI$_2$
  C$_2$H$_5$[(C$_3$H$_7$)$_2$SnO]$_3$OC$_2$H$_5$·(C$_3$H$_7$)$_2$SnI$_2$
  C$_3$H$_7$[(CH$_3$)$_2$SnO]$_3$O(C$_3$H$_7$)·(CH$_3$)$_2$SnI$_2$
  C$_3$H$_7$[(C$_3$H$_7$)$_2$SnO]$_3$O(C$_3$H$_7$)·(C$_3$H$_7$)$_2$SnI$_2$
  C$_4$H$_9$[(CH$_3$)$_2$SnO]$_3$O(C$_4$H$_9$)·(CH$_3$)$_2$SnI$_2$
  C$_2$H$_5$[(CH$_3$)$_2$SnO]$_3$OC$_2$H$_5$·(C$_2$H$_5$)$_2$SnI$_2$ (R$_2$Sn)$_2$O·R$_3$SnX compounds:
  [(CH$_3$)$_3$Sn]$_2$O·(CH$_3$)$_3$SnBr
  [(CH$_3$)$_3$Sn]$_2$O·(CH$_3$)$_3$SnI R$_3$SnOH·R$_2$SnX·H$_2$O compounds:
  (CH$_3$)$_3$SnOH·(CH$_3$)$_3$SnBr·H$_2$O
  (CH$_3$)$_3$SnOH·(CH$_3$)$_3$SnCl·H$_2$O
  (CH$_3$)$_3$SnOH·(CH$_3$)$_3$SnI·H$_2$O (R$_3$SnOH)$_2$·R$_3$SnX compounds:
  [(CH$_3$)$_3$SnOH]$_2$·(CH$_3$)$_3$SnBr
  [(CH$_3$)$_3$SnOH]$_2$·(CH$_3$)$_3$SnCl
  [(CH$_3$)$_3$SnOH]$_2$·(CH$_3$)$_3$SnI
  [(C$_2$H$_5$)$_3$SnOH]$_2$·(C$_2$H$_5$)$_3$SnBr·H$_2$O (R$_2$SnOH)$_2$·R$_3$SnX compounds
  [(C$_2$H$_5$)$_3$SnOH]$_2$·(C$_2$H$_5$)$_3$SnCl·H$_2$O
  [(C$_2$H$_5$)$_3$SnOH]$_2$·(C$_2$H$_5$)$_3$SnI·H$_2$O Among compounds of formula IV those in which R is a member selected from those recited above with respect to the formula I, R' is a member selected from those recited above with respect to the formula II, Y is oxygen, and $l$ is 1 are preferred. As such compound of formula (IV), the following compounds may be exemplified:
  CH$_3$COOSn(CH$_3$)$_2$—O—Sn(CH$_3$)$_2$OOCCH$_3$, CH$_3$COOSn(C$_2$H$_5$)$_2$—O-Sn(C$_2$H$_5$)$_2$OOCCH$_3$, CH$_3$COOSn(C$_3$H$_7$)$_2$-O-Sn(C$_3$H$_7$)$_2$OOCCH$_3$, CH$_3$COOSn(C$_4$H$_9$)$_2$—O—Sn(C$_4$H$_9$)$_2$OOCCH$_3$, CH$_3$COOSn(C$_8$H$_{17}$)$_2$—O—Sn(C$_8$H$_{17}$)$_2$OOCCH$_3$, CH$_3$COOSn(C$_6$H$_5$)$_2$—O—Sn(C$_6$H$_5$)$_2$OOCCH$_3$,
  Cl(CH$_3$)$_2$Sn—O—Sn(CH$_3$)$_2$Cl,
  Cl(C$_2$H$_5$)$_2$Sn—O—Sn(C$_2$H$_5$)$_2$Cl,
  Cl(C$_3$H$_7$)$_2$Sn—O—Sn(C$_3$H$_7$)$_2$Cl,
  Cl(C$_4$H$_9$)$_2$Sn—O—Sn(C$_4$H$_9$)$_2$Cl,
  Cl(C$_8$H$_{17}$)$_2$SnOSn(C$_8$H$_{17}$)$_2$Cl,
  Cl(C$_6$H$_5$)$_2$SnOSn(C$_6$H$_5$)$_2$Cl,
  Br(CH$_3$)$_2$Sn—O—Sn(CH$_3$)$_2$Br,
  Br(C$_2$H$_5$)$_2$SnOSn(C$_2$H$_5$)$_2$Br,
  Br(C$_3$H$_7$)$_2$SnOSn(C$_3$H$_7$)$_2$Br,
  Br(C$_4$H$_9$)$_2$SnOSn(C$_4$H$_9$)$_2$Br,
  Br(C$_8$H$_{17}$)$_2$SnOSn(C$_8$H$_{17}$)$_2$Br,
  Br(C$_6$H$_5$)$_2$SnOSn(C$_6$H$_5$)$_2$Br, I(CH$_3$)$_2$Sn—O—Sn(CH$_3$)$_2$I, I(C$_2$H$_5$)$_2$SnOSn(C$_2$H$_5$)$_2$I, I(C$_3$H$_7$)$_2$SnOSn(C$_3$H$_7$)$_2$I, I(C$_4$H$_9$)$_2$SnOSn(C$_4$H$_9$)$_2$I, I(C$_8$H$_{17}$)$_2$SnOSn(C$_8$H$_{17}$)$_2$I, (CH$_3$)$_3$SnOSn(CH$_3$)$_3$, (C$_2$H$_5$)$_3$SnOSn(C$_2$H$_5$)$_3$, (C$_3$H$_7$)$_3$SnOSn(C$_3$H$_7$)$_3$, (C$_4$H$_9$)$_3$SnOSn(C$_4$H$_9$)$_3$, (C$_8$H$_{17}$)$_3$SnOSn(C$_8$H$_{17}$)$_3$, (C$_6$H$_5$)$_3$SnOSn(C$_6$H$_5$)$_3$, (iso C$_3$H$_9$)$_3$SnOSn(isoC$_3$H$_7$), (iso C$_4$H$_9$)$_3$SnOSn(iso C$_4$H$_9$)$_3$, (C$_5$H$_{11}$)$_3$SnOSn(C$_5$H$_{11}$)$_3$, (C$_6$H$_{13}$)$_3$SnOSn(C$_6$H$_{13}$)$_3$, (C$_7$H$_{15}$)$_3$SnOSn(C$_7$H$_{15}$)$_3$, (C$_6$H$_5$CH$_2$)$_3$SnOSn(CH$_2$C$_6$H$_5$)$_3$, (cyclo C$_6$H$_{11}$)$_3$SnOSn(cyclo C$_6$H$_{11}$)$_3$, (C$_2$H$_5$)$_2$(C$_4$H$_9$)SnOSn(C$_4$H$_9$)(C$_2$H$_5$)$_2$, (CH$_3$)$_2$(C$_8$H$_{17}$)SnOSn(C$_8$H$_{17}$)(CH$_3$)$_2$, (C$_6$H$_5$)$_2$(CH$_2$=CH)SnOSn(CH=CH$_2$)(C$_6$H$_5$)$_2$, (C$_2$H$_5$)$_2$(C$_6$H$_5$O)SnOSn(OC$_6$H$_5$)(C$_2$H$_5$)$_2$, (C$_4$H$_9$)$_2$(C$_{12}$H$_{23}$O)SnOSn(OH$_{23}$C$_{12}$)(C$_4$H$_9$)$_2$, (CH$_3$)$_2$(C$_6$H$_5$O)SnOSn(OC$_6$H$_5$)(CH$_3$)$_2$, (C$_3$H$_7$)$_2$ISnOSn(OH)(C$_3$H$_7$)$_2$, (C$_4$H$_9$)$_2$(HO)SnOSn(OH)(C$_4$H$_9$)$_2$, (C$_6$H$_{13}$)$_2$(CH$_3$O)SnOSnCl(C$_6$H$_{13}$)$_2$, (CH$_3$)$_3$SnSSn(CH$_3$)$_3$, (C$_2$H$_5$)$_3$SnSSn(C$_2$H$_5$)$_3$, (C$_3$H$_9$)$_3$SnSSn(C$_3$H$_9$)$_3$, (C$_4$H$_9$)$_3$SnSSn(C$_4$H$_9$)$_3$, (C$_8$H$_{17}$)$_3$SnSSn(C$_8$H$_{17}$)$_3$, (C$_{12}$H$_{23}$)$_3$SnSSn(C$_{12}$H$_{23}$)$_3$, (C$_6$H$_5$CH$_2$)$_3$SnSSn(CH$_2$C$_6$H$_5$)$_3$, (C$_6$H$_5$)$_3$SnSSn(C$_6$H$_5$)$_3$, (p-isoC$_3$H$_{11}$C$_6$H$_4$CH$_2$)$_3$SnSSn(CH$_2$C$_6$H$_5$ iso C$_3$H$_7$-p)$_3$, and (p-CH$_3$C$_6$H$_4$)$_3$SnSSn(C$_6$H$_4$—CH$_3$-p)$_3$.

Among compounds of formula V those in which R is a member selected from those recited above with respect to the formula I and M is selected from —CH=CH—, $+$CH$_2+_x$ (in which $x$ is an integer of 1 to 4) and —CH$_2$COO$+$CH$_2$CH$_2$O$+_y$OCCH$_2$— (in which $y$ is an integer of 1 to 3) are preferred.

As such compounds of formula V, the following may be exemplified:
  $\overline{\text{-}\!\text{Sn(C}_4\text{H}_9\text{)}_2\text{OCOCH=CHCOO}\!\text{-}}\!_{\overline{3}}$,
  $\overline{\text{-}\!\text{Sn(C}_2\text{H}_5\text{)}_2\text{OCOCH}_2\text{CH}_2\text{COO}\!\text{-}}\!_{\overline{3}}$,
  $\overline{\text{-}\!\text{Sn(C}_6\text{H}_5\text{)}_2\text{OCOCH=CHCOO}\!\text{-}}\!_{\overline{3}}$,
  $\overline{\text{-}\!\text{Sn(CH}_3\text{)}_2\text{—SCH}_2\text{COOCH}_2\text{CH}_2\text{OCOCH}_2\text{S}\!\text{-}}\!_{\overline{3}}$,
  $\overline{\text{-}\!\text{Sn(C}_4\text{H}_9\text{)}_2\text{-O—(CH}_2\text{—}_3\text{O}\!\text{-}}\!_{\overline{2}}$, and
  $\overline{\text{-}\!\text{Sn(CH}_3\text{)}_2\text{—S—CH}_2\text{—COO}\!\text{-}}\!_{\overline{3}}$ In the invention, the esterified products of oxyacids of phosphorus or derivatives thereof of formulae 1, 2, 6 and the product-forming reactants are the most preferred compounds (B) to be reacted with the organotin compound (A) to form the catalyst.

Referring to the formulae 6 through 10, Z is a member selected from the group consisting of alkyl of one to eight carbons and phenyl.

Also as the organic radicals to form the ester, i.e. P—O—C linkage in the completely or partially esterified oxyacids of phosphorous or derivatives thereof of formulae 1 through 10, optionally halogen-substituted, alkyl or alkenyl of one to 12 carbons, which are preferably chlorine- or bromine-substituted; optionally halogen-substituted aryl, which are preferably chlorine- or bromine-substituted phenyl or tolyl; and optionally alkyl-substituted cyclohexyl; may be named. When more than one of such organic radical is present within a same molecule, they may be the same or different. Also when compound (B) is a partially esterified product, the non-esterified hydroxyl radicals may form an acid anhydride, together with mono- or poly-carboxylic acid.

As examples of such completely or partially esterified oxyacids of phosphorus and derivatives thereof, the following compounds may be named.

$(CH_3)_3PO_4$, $(C_2H_5)_3PO_4$, $(C_3H_7)_3PO_4$, $(C_4H_9)_3PO_4$, $(C_5H_{11})_3PO_4$, $(C_6H_{13})_3PO_4$, $(C_7H_{15})_3PO_4$, $(C_8H_{17})_3PO_4$, $(C_9H_{19})_3PO_4$, $(C_{12}H_{23})_3PO_4$, $(CH_2=CHCH_2)_3PO_4$, $(C_6H_5CH_2)_3PO_4$, $(C_6H_5)_3PO_4$, $(CH_3C_6H_5)_3PO_4$, $(C_9H_{19})_2C_6H_5PO_4$, $(C_{12}H_{23})_2(CH_3C_6H_4)PO_4$, $(C_4H_9)_2C_6H_5PO_4$, $(ClCH_2CH_2)_3PO_4$, $(BrCH_2CH_2)_3PO_4$, $(Cl_2C_3H_5)_3PO_4$, $(ClBrC_3H_5)_3PO_4$, $(CH_3)_2HPO_4$, $(C_2H_5)_2HPO_4$, $(C_3H_7)_2HPO_4$, $(C_4H_9)_2HPO_4$, $(C_5H_{11})_2HPO_4$, $(C_6H_{13})_2HPO_4$, $(C_7H_{15})_2HPO_4$, $(C_8H_{17})_2HPO_4$, $(CH_2=CHCH_2)_2HPO_4$, $(C_6H_5CH_2)_2HPO_4$, $(C_6H_5)_2HPO_4$, $(CH_3C_6H_5)_2HPO_4$, $(ClCH_2CH_2)_2HPO_4$, $(C_7H_{15})_2HPO_4$, $(C_8H_{17})_2HPO_4$, $(CH_3)_2(CH_3CO)PO_4$, $(C_2H_5)_2(CH_3CO)PO_4$, $(C_3H_7)_2(CH_3CO)PO_4$, $(C_4H_9)_2(CH_3CO)PO_4$, $(C_5H_{11})_2(CH_3CO)PO_4$, $(C_6H_3)_2(CH_3CO)PO_4(CH_3C_6)PO_4$, $(C_7H_{15})_2(CH_3CO)PO_4$, $(C_8H_{17})_2(CH_3CO)PO_4$, $(CH_2=CHCH_2)_2(CH_3CO)PO_4$, $(C_6H_5CH_2)_2(CH_3CO)PO_4$, $(C_6H_5)_2(CH_3CO)PO_4$, $(CH_3)_4P_2O_7$, $(C_2H_5)_4P_2H_7$, $(C_3H_7)_4P_2O_7$, $(C_4H_9)_4P_2O_7$, $(C_5H_{11})_4P_2O_7$, $(C_6H_{13})_4P_2O_7$, $(C_7H_{15})_4P_2O_7$, $(C_8H_{17})_4P_2O_7$, $(C_2H_5)_2H_2P_2O_7$, $(C_2H_5)_5P_3O_{10}$, $(C_4H_9)_5P_3O_{10}$, $(C_2H_5O)_3P$, $(C_3H_7O)_3P$, $(C_4H_9O)_3P$, $(C_6H_{13}O)_3P$, $(CH_2=CHCH_2O)_3P$, $(ClCH_2Ch_2O)_3P$, $(C_3H_7O)P(OH)_2$, $(C_4H_9O)P(OH)_2$, $(C_2H_5)_2POH$, $(CH_3)_3PO_3$, $(C_2H_5)_3PO_3$, $(C_3H_7)_3PO_3$, $(C_4H_9)_3PO_3$, $(CH_2=CHCH_2)_3PO_3$, $(C_2H_5)_2HPO_3$, $(C_4H_9)H_2PO_3$, $(C_6H_5)_2HPO_3$, $(C_2H_5)_4P_2O_5$, $(C_4H_9)_4P_2O_5$, $C_6H_5(CH_3O)_2PO$, $C_6H_5(C_2H_5O)_2PO$, $C_6H_5(C_3H_7O)_2PO$, $C_2H_5(C_2H_5O)_2PO$, $C_3H_7(C_3H_5O)_2PO$, $C_4H_9(C_4H_9O)_2PO$, $C_6H_5(C_4H_9O)_2PO$, $C_6H_5(C_6H_5O)_2PO$, $(C_6H_5)_2(C_2H_5O)PO$, $(C_6H_5)_2(C_4H_9O)PO$, $(C_2H_5)_2(C_2H_5O)PO$, $(C_2H_5)_2(C_2H_5O)_2P_2O_3$, $[(C_6H_5)_3C]_2(C_2H_5O)_2P_2O_3$, $CH_3P(OC_2H_5)_2$, $C_4H_9P(OC_2H_5)_2$, $C_6H_5P(OC_2H_5)_2$, $(C_6H_5)_2P(OCH_3)$, $(C_6H_5)_2P(OC_2H_5)$, $C_2H_5(C_6H_5)P(OC_2H_5)$, $(C_4H_9)_2P(OC_2H_5)$, $CH_3(C_2H_5)P(OC_2H_5)$.

In this invention, as component (B) a combination of reactants capable of forming the above-mentioned complete or partial esters of phosphorus oxyacids or derivatives thereof may be used. In this case, combinations of at least one phosphorus-containing compound selected from the group consisting of phosphorus compounds containing at least one P—X linkage (in which X stands for a halogen atom) in the molecule, phosphorus compounds containing at least one P—OH linkage in the molecule and phosphorus oxides such as $P_2O_3$, $P_2O_4$ and $P_2O_5$, with at least one member capable of forming the P—O—C linkage by reacting with the phosphorus-containing compound, which is selected from the group consisting of mono- and polyhydric alcohols which may be substituted by halogen, phenols, epoxides and ethylenically unsaturated compounds are used.

Preferable examples of such combination of ester-forming reactants are as follows:

i. A combination of a phosphorus-containing compound having at least one P—X linkage (in which X stands for a halogen atom) in the molecule with a member selected from the group consisting of saturated and unsaturated alcohols of one to 12 carbon atoms, halogen-substituted, saturated and unsaturated alcohols of one to 12 carbon atoms, polyhydric alcohols of two to six carbon atoms, alkyl and cycloalkyl epoxides of two to six carbon atoms, and phenols.

ii. A combination of a phosphorus-containing compound having at least one P—OH linkage in the molecule with a member selected from the group consisting of olefins of one to 12 carbon atoms, olefins of one to 12 carbon atoms substituted by halogen, hydroxy or alkoxy, cyclic olefins of five to eight carbon atoms, alkyl and cycloalkyl epoxides of two to six carbon atoms, saturated and unsaturated alcohols of one to 12 carbon atoms, halogen-substituted, saturated and unsaturated alcohols of one to 12 carbon atoms, and polyhydric alcohols of two to six carbon atoms.

iii. A combination of a phosphorus oxide, preferably phosphoric anhydride, with a member selected from the group consisting of saturated and unsaturated alcohols of one to 12 carbon atoms, and halogen-substituted, saturated and unsaturated alcohols of one to 12 carbon atoms.

As the phosphorus-containing compound having at least one P—X linkage in the molecule, the following compounds may be exemplified:

$PCl_3$, $PBr_3$, $PI_3$, $PCl_5$, $PBr_5$, $PI_5$, $POCl_3$, $POBr_3$, $POI_3$, $(C_2H_5O)_2P(O)Cl$, $(C_8H_{17}O)_2P(O)Br$, $(C_4H_9)_2P(O)I$, $(C_6H_5)_2P(O)Br$, $(C_3H_9O)POCl_2$, $(C_6H_5O)P(O)Br_2$, $C_6H_5P(O)Cl_2$, $(C_2H_5O)_2PCl$, $(C_6H_{13}O)_2PBr$, $(C_4H_9)_2PI$, $(C_6H_5)_2PBr$, $(C_5H_7O)PBr_2$, $(C_3H_7O)PCl_2$, and $(C_6H_{13})PI_2$.

As the phosphorus-containing compound having at least one P-OH linkage in the molecule, oxyacids of phosphorus and derivatives thereof expressed by the formulae 1 to 10, and their partially esterified products may be exemplified. As the phosphorus oxide $P_2O_3$, $P_2O_4$, and $P_2O_5$ may be mentioned, $P_2O_5$ being especially preferred.

As the other reactant to be combined with such phosphorus-containing reactant, aliphatic alcohols of one to 12 carbon atoms, which may be substituted by halogen, such as $CH_3OH$, $C_2H_5OH_4$, $C_3H_7OH$, $isoC_3H_7OH$ may be exemplified, iso $C_4H_9OH$, sec $C_4H_9OH$, $C_5H_{11}OH$, iso $C_5H_{11}OH$, $C_6H_{13}OH$, $C_4H_9OH$ may be exemplified, cyclo $C_6H_{11}OH$, $C_8H_{17}OH$, $CH_2=CHCH_2OH$, $C_6H_5CH_2OH$, and $ClCH_2—CH_2OH$; polyhydric alcohols of two to six carbon atoms such as $HOCH_2CH_2OH$,

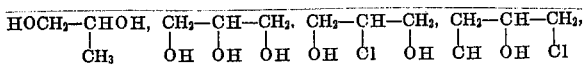

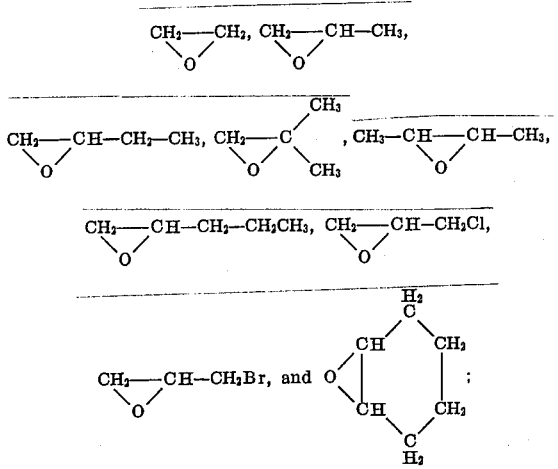

olefins of one to 12 carbon atoms and cyclic olefins of five to eight carbon atoms, which may be substituted by halogen, hydroxy or alkoxy, such as $C_2H_4$, $C_3H_6$, $CH_2=CH-CH_2CH_3, CH_3-CH=CH-CH_3$,

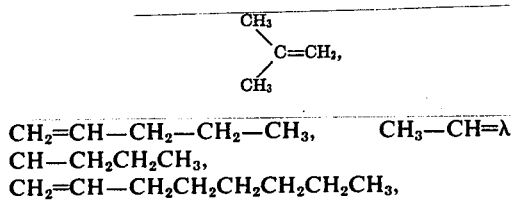

$CH_2=CH-CH_2-CH_2-CH_3$, $CH_3-CH=\lambda CH-CH_2CH_3$,
$CH_2=CH-CH_2CH_2CH_2CH_2CH_3$,

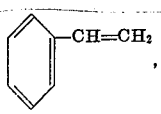

$CH_2=CHCH_2Cl$, $CH_2=CHCH_2OC_4H_9$, $CH_2=CHOC_4H_9$, $CH_2=CHOC_2H_4Cl$,

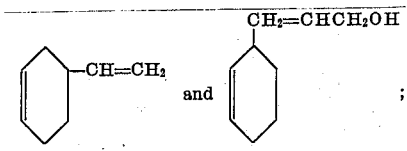

and phenols such as $C_6H_5OH$, ortho-$CH_3C_6H_4OH$, meta-$CH_3C_6H_4OH$, para-$CH_3C_6H_4OH$ and

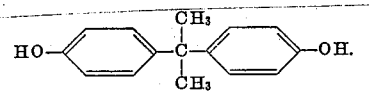

In this invention, the polymerization of vicinal alkylene oxides can be performed in the presence of the catalyst in a manner as adopted in the conventional process. Since the catalyst of this invention possesses a very high stability and exhibits an activity of a very high level, the polymerization operation is greatly facilitated, and the reproducibility of the reaction is extremely excellent.

Various vicinal alkylene oxides can be homopolymerized or co-polymerized by the activity of the catalyst of this invention. The vicinal alkylene oxides polymerizable by the activity of the catalyst of this invention include alkene oxides such as ethylene oxide, propylene oxide, 1-butene oxide, 2-butene oxide, isobutene oxide, butadiene monoxide, 1-hexene oxide and 1-octene oxide; cycloalkyl epoxides such as cyclohexene oxide and vinylcyclohexene monoxide; aromatic substituted epoxides such as styrene oxide and α-methylstyrene oxide; halogen-substituted alkene oxides such as epifluorohydrin, epibromohydrin, epichlorohydrin, epiiodohydrin and methyl epichlorohydrin (methally chloride epoxide); halogen-substituted aromatic epoxides such as p-chlorostyrene oxide; alkyl or alkenyl glycidyl ethers such as methyl glycidyl ether, ethyl glycidyl ether, propyl glycidyl ether, butyl glycidyl ethers, allyl glycidyl ethers and chloroethyl glycidyl ether; cycloalkyl glycidyl ethers such as cyclohexyl glycidyl ether and cyclohexenyl glycidyl ether; aromatic glycidyl ethers such as phenyl glycidyl ether, tolyl glycidyl ether and p-chlorophenyl glycidyl ether; glycidyl esters such as those of acetic acid, acrylic acid, methacrylic acid and benzoic acid; diepoxides such as vinylcyclohexene dioxide and butadiene dioxide; and diglycidyl ethers such as a reaction product of bis-phenol and epichlorohydrin.

In this invention, the polymerization temperature is not critical. For example, the process can be worked at temperatures of such a broad range as from −30°C. to 150°C. However, since the catalyst of this invention exhibits a high activity at relatively low temperatures, usually the reaction is performed at 0°C. to 50°C.

In this invention, a solvent may be optionally present in the polymerization system. A great variety of solvents can be used in this invention. For example, aliphatic hydrocarbons such as heptane, kerosene, n-paraffin and hexane; aromatic hydrocarbons such as benzene and toluene; halogenated hydrocarbons such as methylene chloride, chloroform, carbon tetrachloride and mono-chlorobenzene; ketones such as acetone and methyl ethyl ketone; nitriles such as acetonitrile; ethers such as diethyl ether, di-isopropyl ether, di-n-propyl ether, di-n-butyl ether, tetrahydrofuran and dioxane; nitrated hydrocarbons such as nitromethane, nitroethane and nitrobenzene; and esters such as ethyl acetate, butyl acetate and butyl phthalate may be employed.

The reaction pressure may be atmospheric pressure, or reduced or elevated pressure, inclusive of an autogeneous pressure. Usually, pressures ranging from atmospheric pressure to 50 kg/cm² are employed.

Embodiments of preparation of catalysts of this invention and of polymerization of alkylene oxides with use of such catalysts will now be explained by referring to examples.

Examples 1 to 72
Preparation of Catalysts

In Examples 1 through 72, the preparation of catalysts from combinations of various organotin compounds and esters of oxyacids of phosphorus or derivatives thereof are illustrated. The general method of the preparation was as follows:

An organotin compound and an ester of a phosphorus oxyacid or a derivative thereof was placed in a glass reactor of 500 ml or other suitable capacity with a distilling short column, which was equipped with a stirring means, a heating device and a thermometer, and stirred under heating. The volatile material released was distilled off. The temperature was raised to approximately 280°C. at the highest, but normally to around 250°C. The reaction took place violently, while a large amount of volatile material was being distilled off. When one of the reactants was solid and could not readily be mixed with, or dissolved in, the other homogeneously, the system was heated to attain a homogeneous state. A portion of the distillate was liquefied by cooling with ice water. Unless otherwise specified, the reaction was practised in air. In most cases, the reaction products were brittle, glassy solids.

The reaction products were treated according to any of the following treating method 1 to 5, and used as the catalyst.

1. The product was allowed to cool, ground and used as it was.
2. The product was allowed to cool, ground and heated at 150°C. for 2 hours under a reduced pressure of 0.1 mm Hg.
3. The product was allowed to cool, ground, washed with hexane and dried in vacuo.
4. The product was allowed to cool, ground, washed with ether and dried in vacuo.
5. The product was dissolved in benzene, reprecipitated by the addition of approximately 5 volume times of hexane and dried in vacuo.

Reactants used in the catalyst preparation and reaction conditions adopted are given in Table 1.

Notes a. In Examples 1, 2, 3, 7, 15, 28, 29, 30, 31, 32, 40 and 68, the treatment was conducted in $N_2$ atmosphere.
b. In Example 51, the reactants (A) and (B) were mixed in benzene.
c. In Examples 10, 57 and 58, the reactants (A) and (B) were mixed in methylene dichloride.
d. In Example 62, the reactants (A) and (B) were mixed in carbon tetrachloride, and the reaction was conducted in $N_2$ atmosphere.
e. In Example 63, the reactants (A) and (B) were mixed in carbon tetrachloride.
f. In Example 69, the reactants (A) and (B) were mixed in ethyl ether.

TABLE 1

| Example number | Organotin compound (A) Formula | Amount, grams | Esters of oxyacid of phosphorus and derivatives thereof (B) Formula | Amount, grams | Reaction conditions Time*, min. | Max. temp., °C. | Treatment |
|---|---|---|---|---|---|---|---|
| 1 | $(CH_3)_2SnCl_2$ | 21.9 | $(nC_4H_9)_3PO_4$ | 53.2 | 8 | 260 | 1 |
| 2 | $(C_2H_5)_3SnCl$ | 12 | $(C_2H_5)_3PO_3$ | 23.2 | 10 | 270 | 2 |
| 3 | $C_2H_5SnCl_3$ | 25.3 | $(iso\ C_4H_9)_3PO_4$ | 53.2 | 8 | 265 | 3 |
| 4 | $(iso\ C_3H_7)_3SnCl$ | 14.2 | $(nC_8H_{17})_3PO_4$ | 43.3 | 10 | 265 | 5 |
| 5 | $(nC_4H_9)_3SnCl$ | 104 | $(nC_4H_9)_3PO_4$ | 168.8 | 6 | 265 | 2 |
| 6 | $(nC_4H_9)_3SnCl$ | 104 | $(nC_4H_9)_3PO_4$ | 168.8 | 6 | 265 | 5 |
| 7 | $(nC_4H_9)_3SnCl$ | 5.0 | $(CH_2=CH-CH_2)_3PO_4$ | 6.8 | 15 | 180 | 3 |
| 8 | $(nC_4H_9)_3SnCl$ | 5.0 | $(C_2H_5)_4P_2O_7$ | 9.0 | 6 | 260 | 3 |
| 9 | $(nC_4H_9)_3SnCl$ | 5.0 | $(nC_4H_9)_2(CH_3CO)PO_4$ | 7.8 | 5 | 260 | 3 |
| 10 | $(nC_4H_9)_2SnCl_2$ | 6.1 | $(nC_4H_9)_3PO_4$ | 10.8 | 10 | 260 | 3 |
| 11 | $nC_4H_9SnCl_3$ | 5.6 | $(nC_4H_9)_3PO_4$ | 10.8 | 8 | 260 | 2 |
| 12 | $nC_4H_9SnCl_3$ | 5.6 | $(iso\ C_4H_9)_3PO_4$ | 10.8 | 8 | 260 | 2 |
| 13 | $(nC_4H_9)_3SnF$ | 20 | $(nC_4H_9)_3PO_4$ | 35.5 | 10 | 260 | 1 |
| 14 | $(nC_8H_{17})_2SnI_2$ | 20 | $(nC_4H_9)_3PO_4$ | 18.1 | 6 | 260 | 1 |
| 15 | $(C_6H_5)_3SnCl$ | 38 | $C_6H_5PO(OC_2H_5)_2$ | 4.2 | 10 | 240 | 3 |
| 16 | $(C_6H_5)_2SnF_2$ | 6.2 | $(nC_4H_9)_3PO_4$ | 5.4 | 10 | 260 | 1 |
| 17 | $(C_6H_5)_2SnCl_2$ | 3.4 | $(nC_4H_9)_2HPO_4$ | 4.2 | 10 | 260 | 4 |
| 18 | $C_6H_5SnCl_3$ | 30 | $(nC_4H_9)_3PO_4$ | 53.2 | 8 | 260 | 3 |
| 19 | $(C_6H_5)_4Sn$ | 8.6 | $(nC_4H_9)_3PO_4$ | 10.6 | 10 | 280 | 1 |
| 20 | $(nC_4H_9)_2SnO$ | 12.4 | $(nC_8H_{17})_3PO_4$ | 43.4 | 10 | 280 | 3 |
| 21 | $(nC_8H_{17})_2SnO$ | 18 | $(nC_4H_9)_3PO_4$ | 26.6 | 10 | 280 | 3 |
| 22 | $(C_6H_5)_2SnO$ | 14.4 | $(nC_4H_9)_3PO_4$ | 26.6 | 10 | 280 | 1 |
| 23 | $(nC_5H_{11})_3SnOSn(nC_5H_{11})_3$ | 6.8 | $(nC_4H_9)_3PO_4$ | 10.8 | 8 | 250 | 2 |
| 24 | $(C_2H_5)_2BrSnOSn(C_2H_5)_2Br$ | 4.5 | $(nC_4H_9)_3PO_4$ | 9.2 | 6 | 250 | 2 |
| 25 | $(nC_4H_9)_2Sn(OCOCH_3)_2$ | 17.5 | $(nC_4H_9)_3PO_4$ | 26.6 | 8 | 260 | 2 |
| 26 | $CH_3SnO_{3/2}$ | 3.2 | $(nC_4H_9)_3PO_4$ | 10.8 | 8 | 260 | 1 |
| 27 | $(nC_4H_9)_2Sn\begin{smallmatrix}O-CO-CH\\ \|\|\\ O-CO-CH\end{smallmatrix}$ | 8.0 | $(nC_4H_9)_3PO_4$ | 6.3 | 8 | 260 | 2 |
| 28 | $(C_6H_5)_2SnS$ | 6.0 | $(nC_4H_9)_3PO_4$ | 5.4 | 10 | 280 | 3 |
| 29 | $(nC_4H_9)_2Sn(SC_4H_9)_2$ | 4.1 | $(nC_4H_9)_3PO_4$ | 5.4 | 10 | 280 | 4 |
| 30 | $(C_6H_5CH_2)_2Sn(OCH_3)_2$ | 6.8 | $(nC_4H_9)_3PO_4$ | 10.8 | 10 | 260 | 2 |
| 31 | $(nC_4H_9)_2Sn(OC_6H_5)_2$ | 4.2 | $(nC_4H_9)_3PO_4$ | 5.4 | 10 | 260 | 4 |
| 32 | $(C_6H_5)_3SnH$ | 3.5 | $(nC_4H_9)_3PO_4$ | 7.0 | 10 | 280 | 1 |
| 33 | $(C_2H_5)_3SnOH$ | 2.2 | $(nC_4H_9)_3PO_4$ | 5.2 | 12 | 260 | 4 |
| 34 | $(C_{12}H_{23})_3SnCl$ | 13.0 | $(n-C_4H_9)_3PO_4$ | 10.8 | 10 | 265 | 3 |
| 35 | $(C_6H_5)_3SnCl$ | 38.4 | $(n-C_4H_9)_3PO_4$ | 53.2 | 10 | 270 | 3 |
| 36 | $(cyclo-C_6H_{11})_3SnCl$ | 20.1 | $(n-C_4H_9)_3PO_4$ | 26.6 | 10 | 260 | 2 |
| 37 | $(C_6H_5CH_2)_3SnCl$ | 21.3 | $(n-C_4H_9)_3PO_4$ | 26.6 | 10 | 250 | 3 |
| 38 | $(ortho-CH_3C_6H_4)_3SnBr$ | 14.1 | $(n-C_4H_9)_3PO_4$ | 16.0 | 8 | 260 | 3 |
| 39 | $(1-C_{10}H_7)_2SnCl_2$ | 4.4 | $(n-C_4H_9)_3PO_4$ | 5.4 | 8 | 260 | 3 |
| 40 | $(CH_2=CH)SnCl_3$ | 4.8 | $(n-C_4H_9)_3PO_4$ | 7.3 | 5 | 245 | 2 |
| 41 | $(iso\ C_4H_9)_2SnO$ | 12.5 | $(n-C_4H_9)_3PO_4$ | 26.6 | 6 | 270 | 2 |
| 42 | $(C_6H_5CH_2)_2SnO$ | 15.8 | $(n-C_4H_9)_3PO_4$ | 26.6 | 8 | 260 | 1 |
| 43 | $(cyclo-C_6H_{11})_2SnO$ | 15.0 | $(n-C_4H_9)_3PO_4$ | 26.6 | 8 | 270 | 2 |
| 44 | $[(C_6H_5)_3Sn]_2O$ | 3.5 | $(n-C_4H_9)_4PO_4$ | 4.5 | 6 | 260 | 3 |
| 45 | $((C_4H_9)_3Sn(OCOCH_3)$ | 34.8 | $(n-C_4H_9)_3PO_4$ | 53.2 | 10 | 240 | 4 |
| 46 | $(C_4H_9)Sn(SCH_2COOC_2H_5)_3$ | 5.2 | $(n-C_4H_9)_3PO_4$ | 5.5 | 10 | 250 | 4 |
| 47 | $(C_6H_5)_2Sn(OCOCH=CHCOOC_2H_5)_2$ | 22.2 | $(n-C_4H_9)_3PO_4$ | 26.6 | 8 | 260 | 3 |
| 48 | $(C_4H_9)_2Sn(OCOC_{11}H_{21})_2$ | 63.0 | $(n-C_4H_9)_3PO_4$ | 53.2 | 10 | 240 | 4 |
| 49 | $(C_4H_9)_2Sn(SCH_2COOC_2H_5)_2$ | 5.2 | $(n-C_4H_9)_3PO_4$ | 5.5 | 10 | 250 | 4 |
| 50 | $((C_8H_{17})_2Sn(OCOH)_2$ | 13.4 | $(n-C_4H_9)_3PO_4$ | 26.6 | 8 | 260 | 3 |
| 51 | $(C_6H_5)_3Sn(OC_{18}H_{37})$ | 3.1 | $(n-C_4H_9)_3PO_4$ | 2.7 | 8 | 260 | 4 |
| 52 | $(C_8H_{17})_2Sn\begin{smallmatrix}OC_4H_9\\ \\ CS_{12}H_{23}\end{smallmatrix}$ | 6.2 | $(n-C_4H_9)_3PO_4$ | 5.3 | 8 | 260 | 4 |

TABLE 1

| Example number | Organotin compound (A) Formula | Amount, grams | Esters of oxyacid of phosphorus and derivatives thereof (B) Formula | Amount, grams | Reaction conditions Time*, min. | Max. temp., °C. | Treatment |
|---|---|---|---|---|---|---|---|
| 53 | $[(CH_3)_3Sn]_2CO_3$ | 3.8 | $(C_2H_5)_3PO_4$ | 8.0 | 10 | 220 | 1 |
| 54 | $(C_4H_9)_3SnOCH_2CH_2OSn(C_4H_9)_3$ | 1.5 | $(C_2H_5)_3PO_4$ | 1.0 | 6 | 250 | 4 |
| 55 | $\begin{array}{c}Br\\|\\O=C-O-Sn(C_4H_9)_2\\|\\HC\\|\\HC\\|\\O=C-O-Sn(C_4H_9)_2\\|\\Br\end{array}$ | 1.8 | $(C_2H_5)_3PO_4$ | 1.8 | 8 | 250 | 2 |
| 56 | $[-Sn(C_4H_9)_2OCOCH=CHCOO-]_3$ | 2.0 | $(C_2H_5)_3PO_4$ | 3.2 | 10 | 250 | 2 |
| 57 | $(CH_3)_2SnO \cdot (C_2H_5)_2SnI_2$ | 2.3 | $(C_2H_5)_3PO_4$ | 3.6 | 10 | 260 | 4 |
| 58** | $\left[-CH_2-CH-\atop COOSn(C_4H_9)_3\right]_n$ | 3.6 | $(C_2H_9)_3PO_4$ | 5.5 | 12 | 250 | 4 |
| 59 | $CH_2=CHCH_2SnBr_3$ | 2.0 | $(n-C_4H_9)_3PO_4$ | 10.0 | 10 | 240 | 2 |
| 60 | $(n-C_4H_9)_2SnO$ | 74.4 | $(n-C_4H_9)_3PO_4$ | 159.6 | 8 | 265 | 3 |
| 61 | $(n-C_4H_9)_3SnO$ | 74.4 | $(C_4H_9)_3HPO_3$ | 126.0 | 8 | 260 | 3 |
| 62 | $(CH_2=CH)_2SnO$ | 1.9 | $(C_4H_9)_3HPO_3$ | 4.5 | 6 | 260 | 2 |
| 63 | $(CH_3)_2SnS$ | 1.2 | $(C_4H_9)_3HPO_3$ | 10.8 | 10 | 260 | 3 |
| 64 | $(C_3H_7)_3SnSSn(C_3H_7)_3$ | 3.2 | $(C_4H_9)_3HPO_3$ | 4.5 | 10 | 260 | 3 |
| 65 | $(C_4H_9)_3SnCl$ | 16.2 | $C_6H_5P(O)(OC_2H_5)_2$ | 26.2 | 8 | 260 | 2 |
| 66 | $(C_4H_9)_3SnCl$ | 16.2 | $(ClC_2H_4)_3PO_4$ | 29.6 | 8 | 260 | 2 |
| 67 | $(C_4H_9)_3SnCl$ | 20.0 | $(C_6H_5O)(C_9H_{19}O)_2PO$ | 75.0 | 10 | 270 | 4 |
| 68 | $(C_4H_9)_3SnCl$ | 5.0 | $(C_3H_7)_3PO_3$ | 6.3 | 12 | 210 | 2 |
| 69 | $[(CH_3)_3Sn]_2CO_3$ | 3.5 | $(C_4H_9O)_2P(O)(OH)$ | 8.4 | 10 | 260 | 2 |
| 70 | $(C_4H_9)_2Sn(SC_4H_9)_2$ | 4.1 | $(C_4H_9O)_2P(O)(OH)$ | 4.2 | 10 | 240 | 4 |
| 71 | $(C_6H_5)_2SnCl_2$ | 3.4 | $(C_4H_9O)_2P(O)(OH)$ | 4.2 | 10 | 260 | 2 |
| 72 | $(C_6H_5)_3SnCl$ | 3.8 | $C_6H_5P(O)(OC_2H_5)_2$ | 4.2 | 10 | 240 | 3 |

* Reaction time at a maximum temperature.
** Polymer of a degree of polymerization of about 100.

Examples 73 – 100

The catalysts were prepared by the general method described above by employing combinations of ester-forming reactants instead of the phosphorus oxyacid ester or derivatives thereof and adopting any of the following three types of reaction:

i. Ester-forming reactants were charged in a reactor and they were reacted at room temperature for 30 – 60 minutes under agitation (in case the heat generation was extreme, a cooling means was adopted). Then, the organotin compound was added to the reaction mixture, and the heat reaction was conducted.

ii. The phosphorus-containing compound was charged in a reactor together with the organotin compound, and they were reacted for 40 – 60 minutes by mild heating. Then, the other reactant was added to the reaction mixture, and the heat reaction was conducted.

iii. The organotin compound and both of the ester-forming reactants were charged into a reactor at the same time, they were reacted at room temperature for about 30 minutes (while cooling, if required), and the temperature of the reaction mixture was raised to effect the heat reaction.

Reactants used for the catalyst preparation and the reaction conditions adopted are given in Table I'.

Notes a. In Examples 73, 74, 75, 76, 89, 90, 92, 93, 95, 96 and 98, methylene dichloride was charged as a solvent in a reactor together with the reactants.

b. In Examples 77, 78, 83, 84, 85 and 91, ethyl ether was charged as a solvent into a reactor together with the reactants.

c. In Example 79, 1,1,1-trichloroethane was charged as a solvent into a reactor together with the reactants.

d. In Examples 80 and 81, the heat reaction was effected in $N_2$ gas current.

e. In Examples 94 and 100, carbon tetrachloride was charged as a solvent into a reactor together with the reactants.

TABLE 1'

| Example number | Organotin compound (A) Formula | Amount, grams | Esters-forming reactants (B) Formula | Amount, grams | Reaction conditions Time,* min. | Max. temp., °C. | Treatment | Type of the reaction |
|---|---|---|---|---|---|---|---|---|
| 73 | $(CH_2=CHCH_2)_2(C_2H_5)_2Sn$ | 2.6 | $\{P_2O_5 \atop iso\text{-}C_5H_{11}OH\}$ | 1.2 / 5.0 | 10 | 240 | 2 | (i) |
| 74 | $[(C_4H_9)_3Sn]_3PO_4$ | 9.6 | $\{POCl_3 \atop ClCH_2-CH-CH_2\!\!\diagdown\!\!O\!\!\diagup\}$ | 3.0 / 5.5 | 12 | 230 | 1 | (iii) |
| 75 | $(C_4H_9)_3SnCl$ | 16.2 | $\{POCl_3 \atop CH_3CH_2-CH-CH_2\!\!\diagdown\!\!O\!\!\diagup\}$ | 15.4 / 22.0 | 15 | 230 | 3 | (iii) |

TABLE 1'—Continued

| Example number | Organotin compound (A) Formula | Amount, grams | Esters-forming reactants (B) Formula | Amount, grams | Reaction conditions Time,* min. | Max. temp., °C. | Treatment | Type of the reaction |
|---|---|---|---|---|---|---|---|---|
| 76 | $(C_4H_9)_3SnCl$ | 32.4 | $\{C_6H_5P(O)Cl_2$ $\{C_4H_9OH$ | 39.0 45.0 | 10 | 240 | 2 | (iii) |
| 77 | $(C_4H_9)_3SnCl$ | 5.0 | $H_3PO_4$ phenol (C₆H₅OH) | 3.0 12.5 | 10 | 240 | 4 | (iii) |
| 78 | $(C_4H_9)_3SnCl$ | 5.0 | $\{P_2O_5$ $\{iso\text{-}C_3H_9OH$ | 2.2 5.0 | 9 | 240 | 2 | (iii) |
| 79 | $(C_4H_9)_3SnCl$ | 5.0 | $\{POCl_3$ $\{HOCH_2CH_2OH$ | 4.5 3.3 | 8 | 270 | 4 | (iii) |
| 80 | $(C_4H_9)_3SnCl$ | 5.0 | $\{PCl_3$ $\{C_2H_5OH$ | 4.2 15.0 | 15 | 220 | 2 | (i) |
| 81 | $(C_4H_9)_3SnCl$ | 5.0 | $\{C_6H_5PCl_2$ $\{C_4H_9OH$ | 5.4 9.0 | 10 | 230 | 2 | (i) |
| 82 | $(C_6H_5)_2SnO$ | 57.6 | $\{POCl_3$ $\{C_4H_9OH$ | 61.5 90.0 | 10 | 240 | 2 | (i) |
| 83 | $(C_6H_5)_2SnO$ | 14.4 | $H_3PO_4$ phenol (C₆H₅OH) | 10.0 30.0 | 10 | 230 | 3 | (ii) |
| 84 | $(C_6H_5)_2SnO$ | 11.5 | $\{C_6H_5P(O)(OH)_2$ $\{CH_3\text{-}CH\text{-}CH_2$ with O (propylene oxide) | 12.3 6.0 | 10 | 230 | 4 | (i) |
| 85 | $[(C_4H_9)_3Sn]_2O$ | 6.0 | $\{H_3PO_4$ $\{CH_2=CHOC_6H_{13}$ | 1.8 5.1 | 10 | 240 | 2 | (i) |
| 86 | $(C_{12}H_{23})_2SnO$ | 4.6 | $\{POCl_3$ $\{C_6H_{13}OH$ | 2.2 5.0 | 10 | 230 | 3 | (ii) |
| 87 | $(nata\text{-}CH_2C_6H_5)_2SnO$ | 3.2 | $\{POCl_3$ $\{C_6H_{13}OH$ | 1.5 4.0 | 10 | 230 | 3 | (iii) |
| 88 | $(C_4H_9)_3SnCl$ | 108 | $\{POCl_3$ $\{n\text{-}C_4H_9OH$ | 102.4 185.0 | 10 | 250 | 3 | (i) |
| 89 | $(C_4H_9)_2SnO$ | 24.8 | $\{POCl_3$ $\{n\text{-}C_4H_9OH$ | 15.5 74.0 | 20 | 220 | 2 | (ii) |
| 90 | $(C_4H_9)_2SnO$ | 24.8 | $\{C_6H_5P(O)Cl_2$ $\{n\text{-}C_4H_9OH$ | 19.5 74.0 | 20 | 230 | 2 | (ii) |
| 91 | $(CH_3)_2SnO$ | 15.8 | $\{P_2O_5$ $\{iso\text{-}C_3H_7OH$ | 14.2 50.0 | 10 | 250 | 2 | (iii) |
| 92 | $(C_4H_9)_2Sn(OCOCH_3)_2$ | 29.1 | $\{POCl_3$ $\{n\text{-}C_4H_9OH$ | 15.5 74.0 | 10 | 230 | 2 | (iii) |
| 93 | $(C_4H_9)_2Sn(OCOC_{11}H_{23})_2$ | 64.0 | $\{POCl_3$ $\{n\text{-}C_4H_9OH$ | 15.5 74.0 | 10 | 240 | 4 | (ii) |
| 94 | $(C_6H_5)_3SnOSn(C_6H_5)_3$ | 7.1 | $\{PCl_5$ $\{n\text{-}C_4H_9OH$ | 4.1 37.0 | 10 | 270 | 4 | (iii) |
| 95 | $[-Sn(C_4H_9)_2-O-(CH_2)_3-O-]_2$ | 3.0 | $\{POBr_3$ $\{ClCH_2CH_2OH$ | 2.9 8.0 | 10 | 240 | 4 | (ii) |
| 96 | $(CH_3)_2Sn(OC_{12}H_{23})_2$ | 7.4 | $\{POCl_3$ $\{C_6H_5OH$ | 6.0 11.3 | 10 | 240 | 4 | (i) |
| 97 | $(C_4H_9)_3SnOP(O)(OC_8H_{17})_2$ | 3.1 | $\{POCl_3$ $\{n\text{-}C_4H_9OH$ | 0.8 1.2 | 10 | 220 | 2 | (i) |
| 98 | $(CH_2)_5SnBr_2$ | 3.5 | $\{POCl_3$ $\{n\text{-}C_4H_9OH$ | 3.0 9.0 | 6 | 250 | 2 | (iii) |
| 99 | $(C_8H_{17})_2SnS$ | 1.8 | $\{(iso\text{-}C_3H_7)_2HPO_4$** $\{(iso\text{-}C_3H_7)H_2PO_4$ $\{iso\text{-}C_3H_7OH$ | 1.6 1.2 | 10 | 250 | 2 | (iii) |
| 100 | $(C_4H_9)_3SnOCH_2CH_2OSn(C_4H_9)_3$ | 3.2 | $\{PI_3$ $\{C_8H_{17}OH$ | 8.2 7.8 | 10 | 250 | 2 | (i) |

*Reaction time at maximum temperature.
**Equimolar mixture of 2 phosphorus-containing compounds.

Examples 101–113

In Examples 101 through 113, polymerization results of propylene oxide in the presence of the catalysts prepared in Examples 1 through 32 are shown. The polymerization was effected in a glass ampule. Fifty ml of propylene oxide and 0.4 g of a catalyst were used in each run. The air in the ampule was substituted by nitrogen gas, or sealed as it was, and allowed to stand at 25°C. for 48 hours.

The results are given in Table 2.

TABLE 2

| Ex. No. | Catalyst No. | Solid Polymer Yield(%) | Reduced Viscosity (g/100 ml, in 50°C. benzene) |
|---|---|---|---|
| 101 | Ex. 1 | 96 | 2.90 |
| 102 | 5 | Ca. 100 | 3.51 |
| 103 | 7 | 80 | |
| 104 | 8 | 90 | 3.68 |
| 105 | 9 | 84 | 2.17 |
| 106 | 15 | 89 | |
| 107 | 18 | 94 | 3.90 |
| 108 | 21 | 82 | 3.40 |
| 109 | 26 | 71 | 0.48 |
| 110 | 27 | 89 | 3.10 |
| 111 | 29 | 80 | |
| 112 | 31 | 82 | |
| 113 | 32 | 76 | 0.92 |

Example 114–137

In Examples 114 through 137, results of epichlorohydrin polymerization using various catalysts are shown.

Examples 138–145

In those examples, various alkylene oxide monomers were polymerized, using the catalysts within the scope of this invention. The polymerization was performed in a glass ampule which was allowed to stand undisturbed. The results are shown in Table 4 below.

Examples 146–160

In Examples 146–160, copolymerization of alkylene oxide monomers was performed as indicated in Table 5 below, in the manner similar to Examples 101–113.

TABLE 3

| Example number | Catalyst Ex. No. | Amount of catalyst (g.) | Amount of monomer (g.) | Solvent | Amount of solvent (ml.) | Reaction temp. (°C.) | Reaction time (hr.) | Ether-insoluble polymer, yield (%) |
|---|---|---|---|---|---|---|---|---|
| 114 | 2 | 0.5 | 60 | None | | 50 | 60 | 64 |
| 115 | 3 | 0.5 | 60 | do | | 30 | 18 | 83 |
| 116 | 5 | 0.5 | (¹) | do | | 30 | 20 | ca. 100 |
| 117 | 5 | 0.5 | (¹) | Benzene | 25 | 30 | 20 | 87.5 |
| 118 | 5 | 0.5 | (¹) | Toluene | 25 | 30 | 20 | 87.5 |
| 119 | 5 | 0.5 | (¹) | Methylene chloride | 25 | 30 | 20 | 73.4 |
| 120 | 5 | 0.5 | (¹) | Ethyl ether | 25 | 30 | 20 | 61.0 |
| 121 | 6 | 0.05 | (¹) | None | | 15 | 48 | 80.5 |
| 122 | 6 | 0.5 | (¹) | Benzene | 25 | 30 | 20 | 85 |
| 123 | 10 | 0.5 | 50 | None | | 30 | 25 | 63 |
| 124 | 12 | 0.5 | 50 | do | | 30 | 20 | 85 |
| 125 | 13 | 0.2 | 50 | do | | 25 | 20 | 90 |
| 126 | 14 | 0.2 | 50 | do | | 25 | 20 | 72.5 |
| 127 | 16 | 0.2 | 50 | do | | 25 | 20 | 65 |
| 128 | 17 | 0.2 | 50 | do | | 25 | 20 | 68 |
| 129 | 19 | 0.2 | 50 | do | | 30 | 72 | 67.5 |
| 130 | 20 | 0.2 | 25 | do | | 30 | 20 | 82 |
| 131 | 22 | 0.2 | 25 | do | | 30 | 20 | 78 |
| 132 | 23 | 0.2 | 25 | do | | 30 | 20 | 95 |
| 133 | 24 | 0.2 | 25 | do | | 30 | 20 | 92 |
| 134 | 25 | 0.2 | 25 | do | | 30 | 20 | 92 |
| 135 | 28 | 0.2 | 25 | do | | 30 | 20 | 90 |
| 136 | 29 | 0.2 | 25 | do | | 30 | 20 | 85 |
| 137 | 30 | 0.2 | 25 | do | | 30 | 20 | 88 |

¹ 25 milliliters.

TABLE 4

| Example number | Monomer | Amount of monomer (g.) | Catalyst Ex. No. | Amount of catalyst (g.) | Polymerization temp. (°C.) | Polymerization time (hr.) | Yield (percent) | Reduced viscosity | State of polymer |
|---|---|---|---|---|---|---|---|---|---|
| 138 | EO | ᵃ 11 | 6 | 0.2 | 25 | 48 | 89 | *4.20 | Crystalline. |
| 139 | BO | 40 | 6 | 0.2 | 25 | 48 | 90 | **3.91 | Rubbery. |
| 140 | SO | 40 | 6 | 0.4 | 25 | 24 | 70 | ***0.95 | Crystalline. |
| 141 | SO | 40 | 13 | 0.4 | 30 | 48 | 86 | | Do. |
| 142 | PGE | 25 | 6 | 0.2 | 25 | 48 | 90 | | Do. |
| 143 | BGE | 25 | 11 | 0.2 | 25 | 78 | 60 | | Waxy. |
| 144 | IBO | 10 | 5 | 0.1 | 50 | 78 | 43 | | Crystalline. |
| 145 | VCHDO | 40 | 5 | 0.4 | 50 | 78 | | | Gelled. |

ᵃ Benzene 40 ml.
*0.5 g./100 ml. 30° C. aqeuous solution.
**1 g./100 ml. 50° C. benzene solution.
***1 g./100 ml. 80° C. monochlorobenzene solution.

NOTE.—EO: Ethylene oxide; BO: 1-butene oxide; SO: Styrene oxide; PGE: Phenylglycidyl ether; BGE: n-Butylglycidyl ether; IBO: Isobutene oxide; VCHDO: Vinylcyclohexane dioxide.

TABLE 5

| Ex. No. | Monomers | Amount of monomers (g.) | Catalyst Ex. No. | Amount of catalyst (g.) | Polymerization temp. (°C.) | Polymerization time (hr.) | Polymer yield (percent) | Reduced viscosity |
|---|---|---|---|---|---|---|---|---|
| 146 | EO:EpCH | 11:23 | 3 | 0.1 | 30 | 24 | 88 | |
| 147 | EO:EpCH | 3.0:25 | 6 | 0.03 | 20 | 7 | 18 | 3.4* (Cl content 26.0). |
| 148 | PO:EpCH | 17.5:28 | 12 | 0.05 | 20 | 48 | Ca. 100 | |
| 149 | PO:EpCH | 17.5:28 | 6 | 0.05 | 20 | 48 | Ca. 100 | |
| 150 | PO:EpCH | 23.2:18.5 | 6 | 0.05 | 20 | 48 | Ca. 100 | |
| 151 | PO:EpCH | 9.0:14 Benzene 25 ml | 6 | 0.5 | 20 | 48 | 86 | |
| 152 | PO:EpCH | 9.0:14 Ether 25 ml | 6 | 0.5 | 20 | 48 | 78 | |
| 153 | PO:AGE | 29:3.1 | 5 | 0.3 | 25 | 120 | 91 | Rubbery. |
| 154 | PO:PGE | 13.5:34 | 6 | 0.2 | 25 | 80 | 81 | Do. |
| 155 | PO:IBO | 5:5 | 6 | 0.1 | 30 | 24 | 48 | Do. |
| 156 | EpCH:IBO | 5:5 | 6 | 0.1 | 50 | 24 | 38 | Do. |
| 157 | EpCH:BO | 5:5 | 6 | 0.1 | 30 | 24 | 73 | Do. |
| 158 | PO:828 | 16:8.8 | 1 | 0.2 | 50 | 48 | Gelled | |
| 159 | EpCH:828 | 24:7.8 | 1 | 0.2 | 50 | 48 | do | |
| 160 | EpCH:VCHDO | 24:7.0 | 1 | 0.2 | 50 | 48 | do | |

*0.1 g./100 ml., 50° C. cyclo hexamane solution.

NOTE.—AGE: Allylglycidyl ether; 282: Diglycidylether (trade name: Epikoto 828: products of Shell International Chemicals Corp., U.K.); PO: Propylene oxide; EpCH: Epichlorohydrin.

Examples 161 – 230

In these examples, results of the polymerization or copolymerization of several monomers with use of various catalysts are illustrated.

In the homopolymerization of ethylene oxide (EO) (Examples 161 – 175), 0.15 part of the catalyst was used per 100 parts of a 20 percent by weight solution of EO in a solvent indicated in Table 6, and the reaction was conducted at 30°C. for 20 hours. The reduced viscosity of the resulting polymer was determined with respect to an aqueous solution of a polymer concentration of 0.1 g/100 ml at 35°C.

In the homopolymerization of propylene oxide (PO)-(Examples 176 – 190), 0.3 part of the catalyst was used per 100 parts of a 50 percent by weight solution of PO in benzene, and the reaction was conducted at 30°C for 20 hours. The reduced viscosity of the resulting polymer was determined with respect to a solution of 0.1 g/100 ml polymer in benzene (containing 0.5 percent of 2,2'-methylenebis-(4-methyl-6-tert.-butylphenol) ).

In the homopolymerization of epichlorohydrin (EpCH) (Examples 191 – 210), 1-butene oxide (BO)-(Example 211 – 214), phenyl glycidyl ether (PGE)(Examples 215 – 218) and styrene oxide (SO) (Examples 219 – 222), the bulk polymerization method was adopted unless otherwise indicated. The amount of the catalyst used was 0.1 part per 100 parts of the monomer in the case of the bulk polymerization and 0.3 part per 100 part of the monomer in the case of the solution polymerization.

In the case of EpCH, BO and PGE, the reaction was conducted at 30°C. for 30 hours, and in the case of SO, the reaction was effected at 45°C. for 30 hours.

The reduced viscosity of the resulting polymer was determined with respect to a benzene solution of a polymer concentration of 0.1 g/100 ml at 30°C. in the case of BO, and to a monochlorobenzene solution of a polymer concentration of 0.1 g/100 ml at 80°C. in the case of EpCH, PGE and SO. Each solvent contained 0.5 percent of 2,2'-methylene-bis-(4-methyl-6-tert.-butylphenol).

In the case of the copolymerization (Examples 223 – 230), the reduced viscosity was determined with respect to a benzene solution of a polymer concentration of 0.1 g/100 ml at 30°C. in Examples 224 and 227, and with respect to a monochlorobenzene solution of a polymer concentration of 0.1 g/100 ml in the other Examples. Each of the solvents contained 0.5 percent of the above-mentioned antioxidant, namely 2,2'-methylene-bis-(4-methyl-6-tert.-butylphenol).

Results are shown in Table 6.

TABLE 6

| Ex. No. | Monomer | Catalyst No. | Solvent | Polymer yield | Reduced Viscosity |
|---|---|---|---|---|---|
| 161 | EO | 34 | Hexane | 78 | 10.5 |
| 162 | " | 37 | " | 81 | 11.6 |
| 163 | " | 39 | " | 70 | 8.5 |
| 164 | " | 42 | " | 78 | 9.6 |
| 165 | " | 51 | " | 66 | 6.3 |
| 166 | " | 54 | " | 78 | 9.5 |
| 167 | " | 56 | " | 80 | 10.0 |
| 168 | " | 57 | " | 76 | 12.1 |
| 169 | " | 65 | Benzene | Ca 100 | 14.4 |
| 170 | " | 68 | " | 19.0 | 2.9 |
| 171 | " | 75 | " | 55 | 6.0 |
| 172 | " | 76 | " | Ca 100 | 27.0 |
| 173 | " | 83 | " | 9.0 | |
| 174 | " | 90 | " | Ca 100 | 24.0 |
| 175 | " | 93 | " | Ca 100 | 26.0 |
| 176 | PO | 33 | Benzene | 69 | 4.2 |
| 177 | " | 38 | " | 76 | 5.1 |
| 178 | " | 45 | " | 83 | 6.8 |
| 179 | " | 49 | " | 59 | 4.0 |
| 180 | " | 52 | " | 64 | 3.1 |
| 181 | " | 55 | " | 73 | 7.0 |
| 182 | " | 63 | " | 54 | 3.8 |
| 183 | " | 66 | " | 73 | 5.5 |
| 184 | " | 67 | " | 78 | 7.7 |
| 185 | " | 71 | " | 60 | 6.5 |
| 186 | " | 72 | " | 80 | 8.0 |
| 187 | " | 82 | " | 68 | 7.0 |
| 188 | " | 87 | " | 80 | 9.1 |
| 189 | " | 92 | " | 85 | 8.8 |
| 190 | " | 98 | " | 83 | 7.2 |
| 191 | EpCH | 35 | none | 45 | 1.56 |
| 192 | " | 36 | " | 40 | 1.43 |
| 193 | " | 41 | " | 52 | 1.70 |
| 194 | " | 43 | " | 43 | 1.49 |
| 195 | " | 46 | " | 36 | |
| 196 | " | 48 | " | 44 | 1.37 |
| 197 | " | 50 | " | 44 | 1.80 |
| 198 | " | 53 | " | 38 | |
| 199 | " | 58 | " | 32 | |
| 200 | " | 60 | " | 61 | 1.69 |
| 201 | " | 64 | " | 33 | |
| 202 | " | 69 | " | 48 | 1.55 |
| 203 | " | 70 | " | 40 | |
| 204 | " | 73 | " | 44 | 1.0 |
| 205 | " | 77 | " | 31 | |
| 206 | " | 81 | " | 28 | 0.81 |
| 207 | EpCH | 74 | Benzene | 66 | 1.43 |
| 208 | " | 91 | " | 51 | 1.11 |
| 209 | " | 96 | " | 23 | |
| 210 | " | 99 | " | 31 | |
| 211 | BO | 47 | none | 69 | 6.0 |
| 212 | " | 59 | " | 70 | 4.7 |
| 213 | " | 80 | " | 34 | |
| 214 | " | 85 | " | 67.5 | 5.1 |
| 215 | PGE | 44 | " | 38 | 1.20 |
| 216 | " | 79 | " | 22 | |
| 217 | " | 95 | " | 36.1 | 1.32 |
| 218 | " | 100 | " | 35 | |
| 219 | SO | 40 | " | 42 | 1.18 |
| 220 | " | 78 | " | 33.5 | |
| 221 | " | 84 | " | 23 | |
| 222 | " | 97 | " | 49 | 0.90 |

| Example number | Monomers | Monomer amount (g.) | Catalyst No. | Catalyst amount (g.) | Solvent | Solvent amount (g.) | React. Temp. | React. time | Polymer yield, percent | Reduced viscosity | Cl content, percent |
|---|---|---|---|---|---|---|---|---|---|---|---|
| 223 | EO / EpCH | 2 / 15 | 61 | 0.06 | Hexane | 22 | 18 | 10 | 23 | 2.30 | 27.0 |
| 224 | PO / EpCH | 15 / 5 | 92 | 0.05 | do | 20 | 30 | 20 | 94 | 4.20 | |
| 225 | AGE / EpCH | 1 / 15 | 86 | 0.1 | Benzene | 15 | 30 | 20 | 33 | 1.18 | 33.4 |
| 226 | GMA / EpCH | 1 / 15 | 94 | 0.1 | do | 15 | 30 | 20 | 41 | >0.3 | |
| 227 | EO / PO | 5 / 5 | 89 | 0.05 | do | 15 | 30 | 20 | ca. 100 | 12.80 | |
| 228 | EO / GA | 8 / 2 | 62 | 0.05 | do | 15 | 30 | 20 | 90 | (a) | |
| 229 | EO / AGE / EpCH | 1.5 / 0.5 / 8.0 | 88 | 0.05 | do | 15 | 30 | 20 | 9 | 1.8 | 23.1 |
| 230 | PO / AGE / EpCH | 1.5 / 0.5 / 8.0 | 88 | 0.05 | do | 15 | 30 | 20 | 14 | 2.5 | 22.2 | a Partially gelled.

NOTE.—GA: Glycidyl acrylate; GMA: Glycidyl mtacrylate.

What we claim is:

1. A process for the polymerization of vicinal alkylene oxides, which comprises polymerizing or copolymerizing vicinal alkylene oxides in the presence of a heat-reaction product of (A) an organotin compound and (B) a complete or partial ester of an oxyacid of phosphorus, an acetyl derivative of $(HO)_3PO$, or a combination of reactants which form said ester or derivative under the reaction conditions, said organotin compound (A) containing at least one tin-to-carbon bond in its molecule and being selected from the group consisting of the compounds of the following formulae (I) through (V):

$$R_aSnX_b \qquad (I)$$

wherein R is selected from the group consisting of (i) alkyl of one to 12 carbon atoms, (ii) alkenyl of two to 12 carbon atoms, (iii) aryl, (iv) aryl substituted by alkyl of one to four carbon atoms, (v) cycloalkyl of three to eight carbon atoms and (vi) aralkyl; X is selected from the group consisting of hydrogen, halogen, hydroxy, alkoxy, aryloxy, acyloxy, alkylthio, arylthio, alkylthio substituted by alkoxycarbonyl, alkylthio substituted by hydroxy, alkylthio substituted by acyloxy, alkoxy substituted by alkoxycarbonyl, alkoxy substituted by hydroxy, alkoxy substituted by acyloxy, acyloxy substituted by alkoxycarbonyl, acyloxy substituted by hydroxy, acyloxy substituted by acyloxy, aryloxy substituted by alkyl of one to four carbon atoms and arylthio substituted by alkyl of one to four carbon atoms; $a$ is an integer of 1 through 4; $b$ is an integer of 4 − $a$; and when $a$ is more than 1, each R may be the same or different, and when $a$ is 2 and X is selected from the group consisting of alkoxy, acyloxy and alkylthio, the two X's together may form a ring:

$$(R'_3Sn)_cX' \qquad (II)$$

wherein R' is a member selected from the group consisting of R as defined in formula I and halogen, and at least one R' is selected from R; X' is selected from the group consisting of a carbonate radical, an orthophosphate radical, a radical obtained by removal of the carboxyl hydrogens from a polycarboxylic acid, polyhydric alcohol residues obtained by the removal of hydroxyl hydrogens of polyhydric alcohols, alkylene dithio radicals derived from polythiols, mercapto-carboxylic acid residues obtained by removal of carboxylic hydrogen and mercapto-hydrogen from mercapto-carboxylic acids, mercapto-alcohol residues obtained by removal of hydroxyl hydrogen and mercapto-hydrogen from mercapto-alcohols, and hydroxycarboxylic acid residues obtained by removal of hydroxyl hydrogen and carboxyl hydrogen from hydroxycarboxylic acids; and $c$ is an integer not less than 2 and corresponding to the basicity of the radical X':

$$R_2SnY \text{ or } R_2Sn_2Y_3 \qquad (III)$$

wherein R is as defined above; Y is a member selected from the group consisting of oxygen and sulfur atoms; it being permissible for the compound of formula III to form a complex with a compound of formula I:

$$R' + SnR_2 - Y + SnR_2 - R' \qquad (IV)$$

wherein R is as defined above and each R is the same; Y is as defined above; R' is a member selected from the group consisting of R and X as defined in formula I and may be the same or different; and $$+ SnR_2 - LML' + l' \qquad (V)$$

wherein R is as defined above and the two R's must be the same; L and L', which may be the same or different, are selected from the group consisting of oxygen, sulfur, and

in which the carbon atom is bonded to M; M is a saturated or unsaturated aliphatic radical;
$l'$ is an integer of more than 1 but not more than 3;
and said component (B) being selected from the group consisting of complete or partial esters of a phosphorus oxyacid derived from compounds of the following formulae (1) through (10) ), an acetyl derivative of $(HO)_3PO$, and combinations of reactants capable of forming said esters:

1. $(HO)_3PO$;

(2) 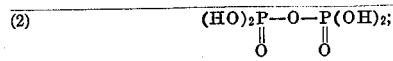

(3) 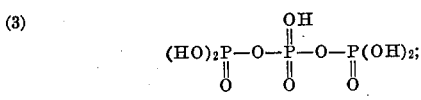

4. $(HO)_3P$;
5. $(HO)_2POP(OH)_2$;
6. $Z(HO)_2PO$ in which Z is a member selected from the group consisting of alkyl of one to eight carbon atoms and phenyl;
7. $Z_2(HO)PO$ in which Z is as defined above;

(8) 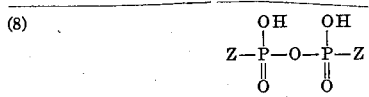

9. $Z(HO)_2P$ in which Z is as defined above; and
10. $Z_2(HO)P$ in which Z is as defined above, said compound (B) containing a P—O—C linkage formed of an organic radical selected from the group consisting of alkyl of one to 12 carbon atoms, unsaturated hydrocarbon of two to 12 carbon atoms, halogen substituted alkyl of one to 12 carbon atoms, unsaturated hydrocarbon of two to 12 carbon atoms, aryl, aralkyl, and cyclohexyl; and when the compound (B) is partially esterified, the hydroxyl groups which are not esterified may optionally form an acid anhydride with a mono-carboxylic acid, said combinations of reactants capable of forming said esters being selected from the group consisting of a combination of a phosphorus-containing compound having at least one P—X linkage wherein X represents a halogen atom in the molecule with a member selected from the group consisting of saturated and unsaturated alcohols of one to 12 carbon atoms, halogen-substituted, saturated and unsaturated alcohols of one to 12 carbon atoms, polyhydric alcohols of two to six carbon atoms, alkyl and cycloalkyl epoxides of two to six carbon atoms, and phenols; a combination of a phosphorus-containing compound having at least one P—OH linkage in the molecule with a member selected from the group consisting of olefins of one to 12 carbon atoms, olefins of one to 12 carbon atoms substituted by halogen, hydroxy or alkoxy, cyclic olefins of five to eight carbon atoms, alkyl and cycloalkyl epoxides of two to six carbon atoms, saturated and unsaturated alcohols of one to 12 carbon atoms, halogen-substituted, saturated and unsaturated alcohols of one to 12 carbon atoms, and polyhydric alcohols of two to six carbon atoms; and a combination of a phosphorus oxide with a member selected from the group consisting of saturated and unsaturated alcohols of 1 to 12 carbon atoms, and halogen-substituted, saturated and unsaturated alcohols of one to 12 carbon atoms.

2. The process of claim 1, wherein the heat-reaction product contains at least one phosphorus atom per tin atom.

3. The process of claim 1, wherein the heat-reaction product is one formed by reacting said organotin compound (A) with said esterified product or said combination of ester-forming reactants (B) by heating them at a temperature ranging from 80°C. to 500°C.

4. The process of claim 1 wherein the heat-reaction product is present in the polymerization system in an amount of 0.001 to 5.0 percent by weight based on the vicinal alkylene oxide monomer.

5. The process of claim 1, wherein the component (B) is a member selected from the group consisting of complete and partial alkyl esters of an oxyacid of phosphorus.

* * * * *